(12) United States Patent
Zhou et al.

(10) Patent No.: US 7,990,377 B2
(45) Date of Patent: Aug. 2, 2011

(54) REAL-TIME RENDERING OF LIGHT-SCATTERING MEDIA

(75) Inventors: Kun Zhou, Beijing (CN); Zhong Ren, Beijing (CN); Stephen Ssu-te Lin, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 11/830,743

(22) Filed: Jul. 30, 2007

(65) Prior Publication Data

US 2009/0006046 A1 Jan. 1, 2009

Related U.S. Application Data

(63) Continuation-in-part of application No. 11/768,894, filed on Jun. 26, 2007.

(51) Int. Cl.
*G06T 15/00* (2011.01)
(52) U.S. Cl. ........ 345/423; 345/424; 345/426; 382/128; 700/132
(58) Field of Classification Search .................. 345/424, 345/426, 423; 382/128; 700/132
See application file for complete search history.

(56) References Cited

U.S. PATENT DOCUMENTS

| | | | |
|---|---|---|---|
| 5,412,796 A | 5/1995 | Olive | |
| 5,696,892 A | 12/1997 | Redmann et al. | |
| 5,742,749 A | 4/1998 | Foran et al. | |
| 5,754,185 A | 5/1998 | Hsiao et al. | |
| 5,884,226 A | 3/1999 | Anderson et al. | |
| 5,990,903 A | 11/1999 | Donovan | |
| 6,064,392 A | 5/2000 | Rohner | |
| 6,184,857 B1 | 2/2001 | Latham | |
| 6,256,038 B1 * | 7/2001 | Krishnamurthy | 345/419 |
| 6,268,861 B1 | 7/2001 | Sanz-Pastor et al. | |
| 6,271,856 B1 * | 8/2001 | Krishnamurthy | 345/581 |
| 6,437,781 B1 | 8/2002 | Tucker et al. | |
| 6,529,194 B1 | 3/2003 | Yamaguchi | |
| 6,556,197 B1 | 4/2003 | Van Hook et al. | |
| 6,567,083 B1 | 5/2003 | Baum et al. | |
| 6,580,430 B1 | 6/2003 | Hollis et al. | |
| 6,580,936 B2 | 6/2003 | Muraki et al. | |

(Continued)

FOREIGN PATENT DOCUMENTS

EP 1347419 A2 9/2003

(Continued)

OTHER PUBLICATIONS

Juba et al, Modelling and Rendering Large Volume Data with Gaussian Radial Basis Function, University of Maryland, Apr. 2007, pp. 1-16.*

(Continued)

*Primary Examiner* — Phu Nguyen
(74) *Attorney, Agent, or Firm* — Lee & Hayes, PLLC

(57) ABSTRACT

A real-time algorithm for rendering of an inhomogeneous scattering media such as smoke under dynamic low-frequency environment lighting is described. An input media animation is represented as a sequence of density fields, each of which is represented by an approximate model density field and a residual density field. The algorithm uses the approximate model density field to compute an approximate source radiance, and further computes an effective exitant radiance by compositing the approximate source radiance using a compositing methods such as ray marching. During the compositing process (e.g., ray marching), the residual field is compensated back into the radiance integral to generate images of higher detail.

20 Claims, 9 Drawing Sheets

U.S. PATENT DOCUMENTS

| | | | |
|---|---|---|---|
| 6,686,915 | B2 | 2/2004 | Andrews |
| 6,762,760 | B2 | 7/2004 | Deering |
| 6,799,141 | B1 | 9/2004 | Stoustrup et al. |
| 6,825,840 | B2 | 11/2004 | Gritz |
| 6,897,878 | B2 | 5/2005 | Cosman et al. |
| 6,956,576 | B1 | 10/2005 | Deering et al. |
| 6,989,831 | B2 | 1/2006 | Ebersole et al. |
| 7,046,243 | B1 | 5/2006 | Mech |
| 7,133,041 | B2 | 11/2006 | Kaufman et al. |
| 7,184,043 | B2 | 2/2007 | Anderson et al. |
| 7,184,051 | B1 | 2/2007 | Matsumoto et al. |
| 7,242,401 | B2 | 7/2007 | Yang et al. |
| 7,245,301 | B2 | 7/2007 | Mech |
| 7,262,770 | B2 | 8/2007 | Sloan et al. |
| 7,348,977 | B2 | 3/2008 | West et al. |
| 7,538,764 | B2 * | 5/2009 | Salomie .................. 345/420 |
| 7,602,398 | B2 * | 10/2009 | Zhou et al. .............. 345/582 |
| 2001/0030648 | A1 | 10/2001 | Deering |
| 2005/0275626 | A1 | 12/2005 | Mueller et al. |
| 2006/0028468 | A1 | 2/2006 | Chen et al. |
| 2006/0176303 | A1 | 8/2006 | Fairclough |

FOREIGN PATENT DOCUMENTS

| | | | |
|---|---|---|---|
| JP | 2002216158 | A | 8/2002 |
| JP | 2003296750 | A | 10/2003 |
| JP | 2005135052 | A | 5/2005 |
| JP | 2005346165 | A | 12/2005 |
| JP | 2006318389 | A | 11/2006 |

OTHER PUBLICATIONS

Hegeman et al, A Lighting Model for General Participating Media, ACM, Apr. 2005, pp. 117-124, 223.*

Blinn, "Light Reflection Functions for Simulation of Clouds and Dusty Surfaces," In Proceedings of SIGGRAPH 82, vol. 16, No. 3, Jul. 1982, pp. 21-29.

Cerezo et al, "A Survey on Participating Media Rendering Techniques," The Visual Computer vol. 21, No. 5, 2005, 24 pgs.

Harris, et al., "Real-Time Cloud Rendering", at <<http://www.cs.unc.edu/Research/nano/documentarchive/publications/2001Harris%20RTClouds_EG2001.pdf>>, EUROGRAPHICS, vol. 20, No. 3, 2001, 9 pgs.

Harris, "Real-Time Cloud Simulation and Rendering," dissertation available at <<http://www.markmark.net/dissertation/harrisDissertation.pdf>>, University of North Carolina at Chapel Hill, 2003, 173 pgs.

Harris, "Real-Time Cloud Rendering for Games", at <<http://charm.cs.uiuc.edu/users/olawlor/academic/thesis/ref/RTCloudsForGames_HarrisGDC2002.pdf>>, Appears in Game Developers Conference, 2002, pp. 1-14.

Hege et al, "Volume Rendering Mathematical Models and Algorithmic Aspects," available at <<http://www.cs.ucsb.edu/~holl/pubs/hege-1993-vrm.pdf>>, Technical report, Konrad-Zuse-Zentrum fur Informationstechnik Berlin (ZIB), TR 93-7, 1993, Berlin, Germany, pp. 1-36.

Man, "Generating and Real-Time Rendering of Clouds", available at least as early as Aug. 31, 2007, at <<http://www.cescg.org/CESCG-2006/papers/Prague-Man-Petr.pdf>>, Czech Technical University in Prague, Czech Republic, 2006, 8 pgs.

McGuire, et al., "Real-Time Rendering of Cartoon Smoke and Clouds", available at least as early as Apr. 24, 2007, at <<http://delivery.acm.org/10.1145/1130000/1124733/p21-mcguire.pdf?key1=1124733&key2=2871847711&coll=GUIDE&dl=GUIDE&CFID=17296249&CFTOKEN=96392500>>, ACM, 2006, pp. 21-26.

Nealen, et al., "Physically Based Deformable Models in Computer Graphics", retrieved on Apr. 26, 2007, at <<http://www.blackwell-synergy.com/doi/abs/10.1111/j.1467-8659.2006.01000.x>>, Blackwell Synergy, vol. 25, No. 4, Dec. 2006, pp. 1-24.

Ng et al, "Triple Product Wavelet Integrals for All-Frequency Relighting," ACM Transactions on Graphics, vol. 23, No. 3, Jul. 2004, 477-487.

O'Rourke, "Computational Geometry in C," Second Edition. Cambridge University Press, Cambridge, England, 1998, book overview retrieved at <<http://maven.smith.edu/~orourke/books/compgeom.html>>and <<http://maven.smith.edu/~orourke/books/cgc-dtoc.html>>, 9 pgs.

Premoze, et al., "Practical Rendering of Multiple Scattering Effects in Participating Media", at <<http://www.cs.columbia.edu/cg/pdfs/50_HRPIEG.pdf>>, The Eurographics Symposium on Rendering, 2004, 12 pgs.

Reeves, "Particle Systems—A Technique for Modeling a Class of Fuzzy Objects," Computer Graphics, vol. 17, No. 3, Jul. 1983, pp. 359-375.

Sloan et al, "Precomputed Radiance Transfer for Real-Time Rendering in Dynamic, Low-Frequency Lighting Environments," ACM Transactions on Graphics, 2002, 527-536.

Snyder, "Code Generation and Factoring for Fast Evaluation of Low-Order Spherical Harmonic Products and Squares," Tech. Rep.MSR-TR-2006-53, Microsoft Corporation, Feb. 2006, 9 pgs.

Sun et al, "A Practical Analytic Single Scattering Model for Real Time Rendering," ACM Transactions on Graphics, Aug. 2005, 1040-1049.

Venceslas, et al., "Real Time Rendering of Atmospheric Scattering and Volumetric Shadows", UNION Agency-Science Press, vol. 14, Jan. 30-Feb. 3, 2006, 8 pgs.

Zhou et al, "Fogshop: Real-Time Design and Rendering of Inhomogeneous, Single-Scattering Media," available at <<http://research.microsoft.com/users/kunzhou/publications/MSR-TR-2007-37.pdf>>, Microsoft Research MSR-TR-2007-37, Mar. 2007, 9 pgs.

Zhou, et al., "Real-Time Smoke Rendering Using Compensated Ray Marching", at <<http://research.microsoft.com/ research/pubs/view.aspx?tr_id=1385>>, Sep. 2007, 11 pgs.

Jensen et al., "A Practical Model for Subsurface Light Transport", ACM Siggraph 2001, Aug. 2001, Los Angeles, CA, 8 pages.

Pighin et al., "Modeling and Editing Flows Using Advected Radial Basis Functions", ACM SIGGRAPH Symposium on Computer Animation (2004), pp. #223-pp. #232.

Riley et al., "Efficient Rendering of Atmospheric Phenomena", Eurographice Symposium on Rendering 2004, pp. #1-pp. #12.

* cited by examiner

REAL-TIME RENDERING OF LIGHT-SCATTERING MEDIA

CROSS-REFERENCE TO RELATED APPLICATIONS

This application is a continuation-in-part of application Ser. No. 11/768,894 filed on Jun. 26, 2007, entitled "Real-Time Rendering of Light-Scattering Media", the entire contents of which are hereby incorporated by reference.

BACKGROUND

Computer graphics systems are used in many game and simulation applications to create atmospheric effects such as fog, smoke, clouds, smog and other gaseous phenomena. These atmospheric effects are useful because they create a more realistic sense of the environment and also create the effect of objects appearing and fading at a distance.

Extensive research has been done on realistic simulation of participating media, such as fog, smoke, and clouds. The existing methods includes analytic methods, stochastic methods, numerical simulations, and pre-computation techniques. Most of these techniques focus on computing the light distribution through the gas and present various methods of simulating the light scattering from the particles of the gas. Some resolve multiple scattering of light in the gas and others consider only first order scattering (the scattering of light in the view direction) and approximate the higher order scattering by an ambient light. A majority of the techniques use ray-tracing, voxel-traversal, or other time-consuming algorithms to render the images.

In some approaches, smoke and clouds are simulated by mapping transparent textures on a polygonal object that approximates the boundary of the gas. Although the texture may simulate different densities of the gas inside the 3D boundary and compute even the light scattering inside the gas, it does not change, when viewed from different directions. Consequently, these techniques are suitable for rendering very dense gases or gasses viewed from a distance.

Other methods simplify their task by assuming constant density of the gas at a given elevation, thereby making it possible to use 3D textures to render the gas in real time. The assumption, however, prevents using the algorithm to render inhomogeneous participating media such as smoke with irregular thickness and patchy fog.

There are also methods that use pre-computation techniques in which various scene-dependent quantities are pre-computed. The precomputed quantities, however, are valid only for the given static participating medium. For dynamic animation sequences with adjustable media (e.g. smoke) parameters, the preprocessing time and storage costs would be prohibitive.

With the existing techniques that do offer quality rendering, considerable simulation time is still needed to render a single image, making these approaches inappropriate for interactive applications on animated sequences. These methods may also be inadequate to addresses complex environment illumination. Rendering of smoke, for example, presents a particularly challenging problem in computer graphics because of its complicated effects on light propagation. Within a smoke volume, light undergoes absorption and scattering interactions that vary from point to point because of the spatial non-uniformity of smoke. In static participating media, the number and complexity of scattering interactions lead to a substantial expense in computation. For a dynamic medium like smoke having an intricate volumetric structure changing with time, the computational costs can be prohibitive. Even with the latest computational processing power, rendering large volume high quality images of a dynamic smoke scene can be time-consuming. For video and animation applications, if real-time rendering at a rate of at least twenty frames per second cannot be achieved, much of the rendering may need to be precomputed at a cost of losing flexibility and interactive features.

Despite the practical difficulties of rendering inhomogeneous light scattering media (e.g., smoke), such rendering nevertheless remains a popular element in many applications such as films and games. From an end user's point of view, what is needed is an ability to render in real-time complex scenes with high quality visual realism. From a designer's point of view, what is needed is affordable real-time or close to real-time control over the lighting environment and vantage point, as well as the volumetric distribution and optical properties of the smoke.

SUMMARY

Real-time rendering inhomogeneous scattering media animations (such as smoke animations) with dynamic low-frequency environment lighting and controllable smoke attributes is described. An input media animation is represented as a sequence of density fields, each of which is represented by an approximate model density field and a residual density field. The algorithm uses the approximate model density field to compute an approximate source radiance, and further computes an effective exitant radiance by compositing the approximate source radiance using a compositing methods such as ray marching. During ray marching, the residual field is compensated back into the radiance integral to generate images of higher detail.

In one embodiment, the effective exitant radiance includes a base component and a compensation component. The base component is computed by integrating the approximate source radiance along a view ray in the approximate model density field, while the compensation component is computed by integrating the approximate source radiance along the view ray in the residual density field.

In some embodiments, the approximate model density field is decomposed into a weighted sum of a set of radial basis functions (RBFs). Source radiances from single and optionally multiple scattering are directly computed at only the RBF centers and then approximated at other points in the volume using an RBF-based interpolation. To further speed up the computation, data compression is applied to compress the values of the residual density field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Several exemplary processes for rendering an inhomogeneous scattering medium are illustrated with reference to FIGS. 1-5. The order in which the processes described is not intended to be construed as a limitation, and any number of the described method blocks may be combined in any order to implement the method, or an alternate method.

Figure 1:
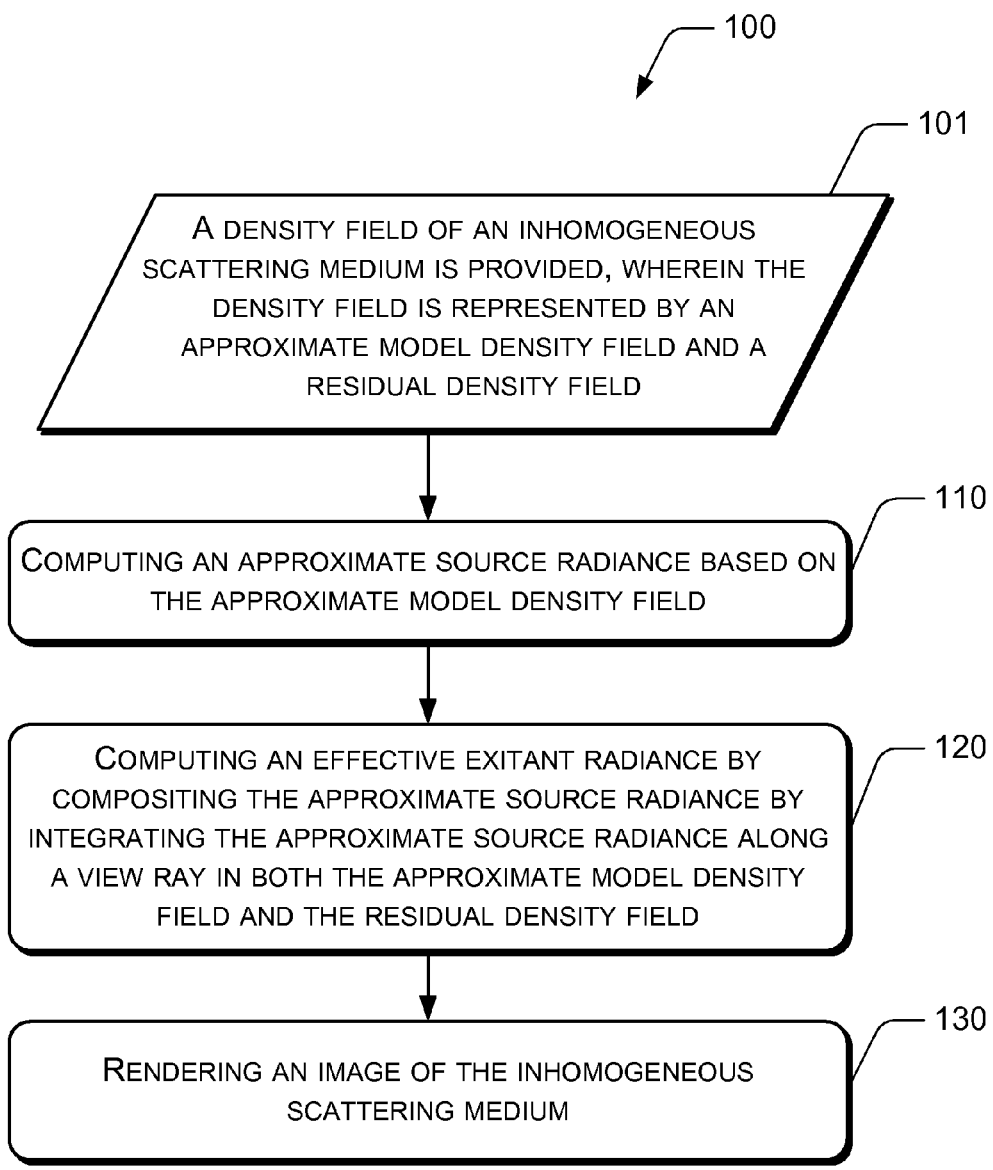
FIG. 1 is a flowchart of an exemplary process for rendering an inhomogeneous scattering medium.

FIG. 1 is a flowchart of an exemplary process for rendering an inhomogeneous scattering medium. The process 100 starts at block 101 where the original density field of an inhomogeneous scattering medium is provided. The original density field is represented by the sum of an approximate model density field and a residual density field. Typically, the approximate model density field is first obtained by modeling the original density field, and the residual density field is then taken as the difference between the original density field and the approximate model density field. Further detail of the modeling is described in later sections of this description.

At block 110, the process computes an approximate source radiance based on the approximate model density field. Further detail of the competition is described in later sections of this description.

At block 120, the process computes an effective exitant radiance by compositing the approximate source radiance along a view ray. In one embodiment, the approximate source radiance is composited by integrating the approximate source radiance in both the approximate model density field and the residual density field. This approximation takes at least partial account of the effect of the residual density field. For example, the effective exitant radiance may include a base component and a compensation component. As will be shown in further detail below, the base component is computed by integrating the approximate source radiance along a view ray in the approximate model density field, while the compensation component is computed by integrating the approximate source radiance along the view ray in the residual density field. It is appreciated that given the framework of the approximation and the associated computation as described herein, the actual computation may be accomplished in a variety of ways. For example, the approximate source radiance component and the compensation component may be computed separately first. Alternatively, the effective existent radiance may be computed using a combined procedure in which the approximate source radiance and the compensation component are computed concurrently. Exemplary equations for such computation will be provided along with the detailed description of algorithms below.

At block 130, the process renders an image of the inhomogeneous scattering medium based on the effective exitant radiance.

As will be described in further below, the approximate source radiance may be composited by performing a ray marching procedure which includes decomposing a volume space of the density field into a plurality of slices along a central view frustum and calculating a discrete integral of the approximate source radiance slice by slice.

An exemplary approximate model density is a RBF model density field which is expressed by a weighted sum of a set of radial basis functions (RBFs) each having a RBF center. Further detail of using a RBF model density field is discussed below.

Figure 2:
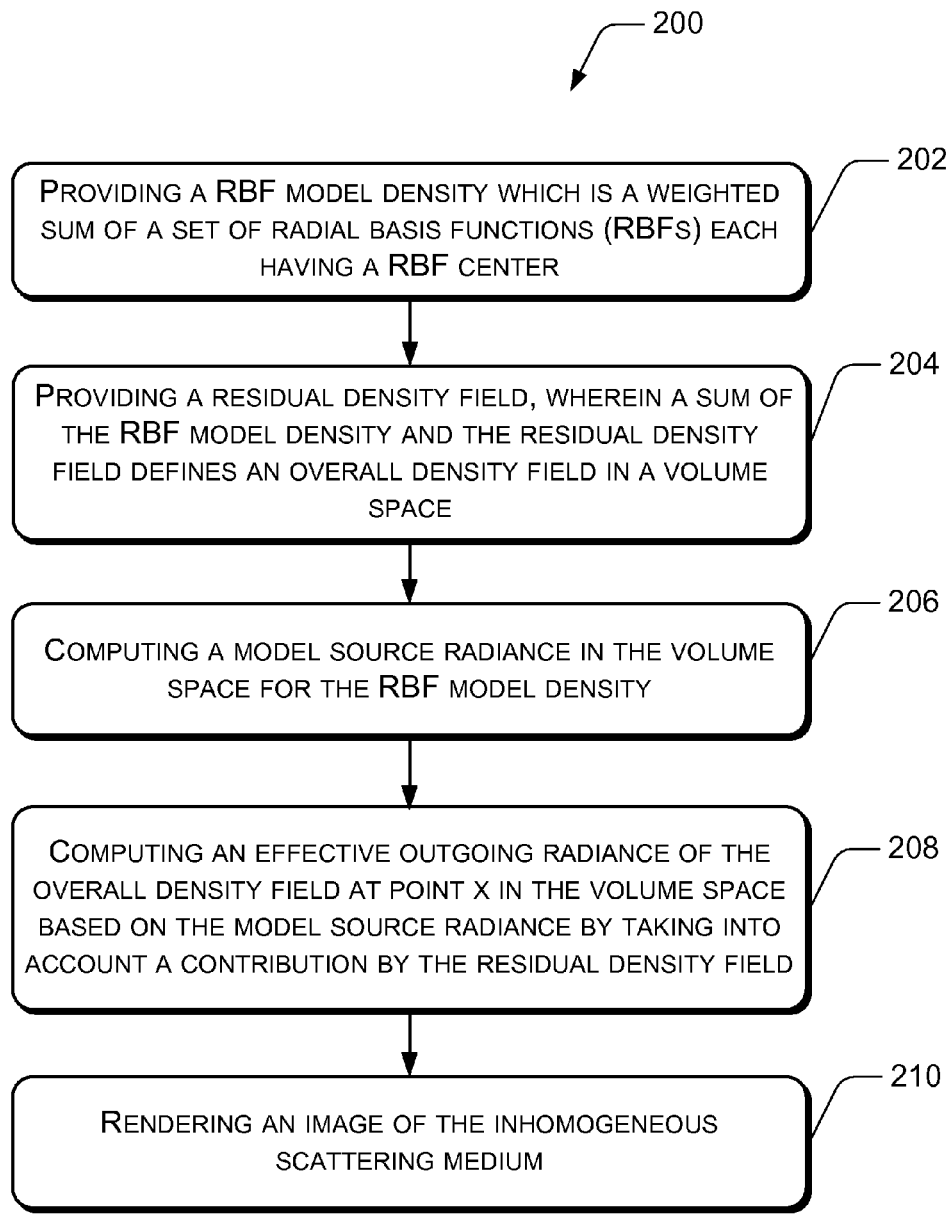
FIG. 2 is a flowchart of an exemplary process of rendering an inhomogeneous scattering medium using a RBF model density field.

FIG. 2 is a flowchart of an exemplary process of rendering an inhomogeneous scattering medium using a RBF model density field. In this exemplary process, the RBF model density field is only an approximation of an actual density field. A residual density field is used to compensate the RBF model density field to more closely simulate the actual density field.

The process 200 starts at block 202 at which a RBF model density field is provided. The RBF model density field is a weighted sum of a set of radial basis functions (RBFs) each having a RBF center. The RBF model density field may be provided in various manners and circumstances. For example, the RBF model density field may have been previously acquired as a result of decomposing an actual density field. The decomposition of the actual density field may either be done in the same process 200 of FIG. 2, or in a different process at a different location by a different party.

At block 204, a residual density field is provided. The sum of the RBF model density field and the residual density field defines an overall density field which is more realistic.

At block 206, the process computes a model source radiance in the volume space for the RBF model density field. The techniques (e.g., the interpolation technique) described herein may be used for calculating the model source radiance in the volume space. For example, the process 200 may first compute the value of source radiance at each RBF center. Detail of such computation is described later with the illustration of exemplary embodiments. As will be shown, computing the values of the source radiance at RBF centers only (instead of the values at all voxel points in the volume space) for the RBF model density field simplifies the computation, and can be carried out real time at a video or animation rate (e.g., at least 10 frames per second, or preferably 20 frames per second or above). The process 200 then approximates the values of the source radiance at other points in the volume space by interpolating from the values of the source radiance at the RBF centers. Any suitable interpolation technique may be used. In particular, a special interpolation technique is described herein which approximates the source radiance at any point x as a weighted combination of the source radiances at the RBF centers. Interpolation is a much faster process than directly computing the values of source radiance at various voxels in the volume space, especially when the direct computation requires a physics-based simulation.

At block 208, the process computes effective exitant radiance at point x in the volume space based on the model source radiance by taking into account contributions by the residual density field. The point x can be any point in the 3-D volume space. The effective exitant radiance is thus computed as a function of x. Similar to that in FIG. 1, lacking an analytical form, the effective exitant radiance is calculated at discrete points x, each corresponding to a discrete voxel. The effective exitant radiance is calculated based on several input information including the reduced incident radiance, the source radiance at each voxel, and the density field. Various degrees of approximation may be taken in the process of the computation, as discussed in detail with the exemplary embodiments sections of this description. In one exemplary embodiment, while the model source radiance is used as an approximation of the total source radiance, the density field includes the residual density field to result in an effective exitant radiance more realistic than the result obtained from using a simple RBF model density field alone.

At block 210, the process renders an image of the inhomogeneous scattering medium based on the effective exitant radiance.

Figure 3:
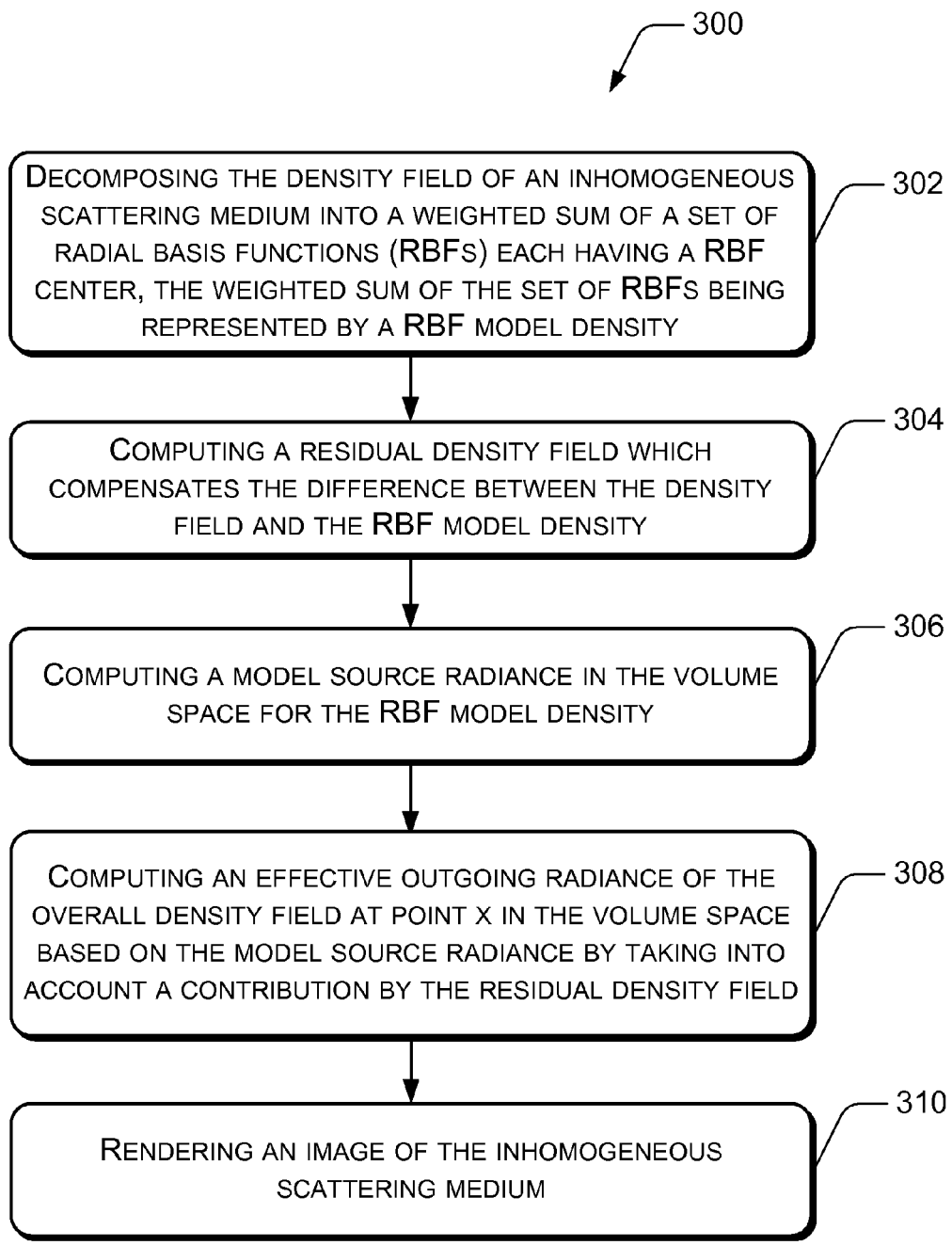
FIG. 3 is a flowchart of another exemplary process of rendering an inhomogeneous scattering medium.

FIG. 3 is a flowchart of another exemplary process of rendering an inhomogeneous scattering medium. This exemplary process is a variation of the exemplary process shown in FIG. 2. Like that in FIG. 2, the RBF model density field is only an approximation of an actual density field. A residual density field of an inhomogeneous scattering medium is used to compensate the RBF model density field to more closely simulate the actual density field. In the process 300 of FIG. 3, however, an existing realistic automotive density is first provided. The process 300 starts at block 302 by decomposing the given density field into a weighted sum of a set of radial basis functions (RBFs) each having a RBF center. The weighted sum of the set of RBFs gives a RBF model density field which is an approximate representation of the actual density field.

At block 304, the process computes a residual density field which compensates the difference between the density field and the RBF model density field residual density field. In a straightforward example, the residual density field is obtained by calculating the difference between the density field and the RBF model density field residual density field. The sum of the RBF model density field and the residual density field defines a more realistic overall density field of the inhomogeneous scattering medium.

At block 306, the process computes a model source radiance in the volume space for the RBF model density field. This step is similar to that in block 206 of FIG. 2.

At block 308, the process computes effective exitant radiance at point x in the volume space based on the model exitant radiance by taking into account contributions by the residual density field. This step is similar to that in block 208 of FIG. 2.

At block 310, the process renders an image of the inhomogeneous scattering medium based on the effective exitant radiance. This step is similar to that in block 210 of FIG. 2.

Figure 4:
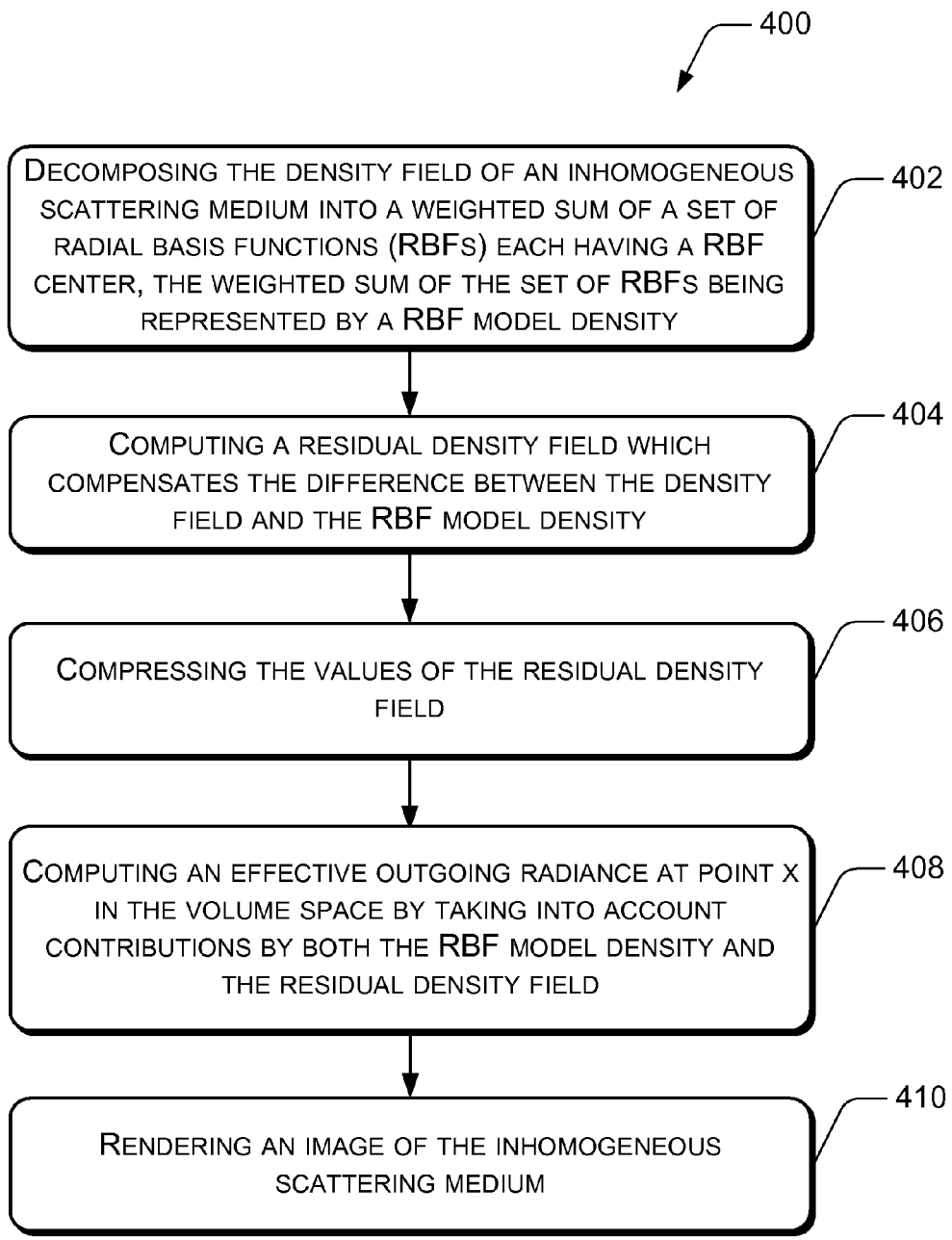
FIG. 4 is a flowchart of another exemplary process of rendering an inhomogeneous scattering medium.

FIG. 4 is a flowchart of another exemplary process of rendering an inhomogeneous scattering medium. Like that in FIGS. 2-3, the RBF model density field is only an approximation of an actual density field. A residual density field of an inhomogeneous scattering medium is used to compensate the RBF model density field to more closely simulate the actual density field. The process 400 of FIG. 4 introduces a technique for faster processing the residual density field. The process 400 starts at block 402 by decomposing the given density field into a weighted sum of a set of radial basis functions (RBFs) each having a RBF center. The weighted sum of the set of RBFs gives a RBF model density field which is an approximate representation of the actual density field.

At block 404, the process computes a residual density field which compensates the difference between the density field and the RBF model density field residual density field.

At block 406, the process compresses the values of the residual density field. Because the residual density field tends to have small values at most points in the volume space, the entries of the residual density field at points where the residual density field has a value at or below a given threshold may be made zero to result in sparsity. This sparsity may be advantageously used to simplify and speed up the calculations. As will be shown in further detail in the exemplary embodiments described herein, in one embodiment, the residual density field is compressed by performing a spatial hashing on values of the residual density field.

At block 408, the process computes effective exitant radiance at point x in the volume space by taking into account contributions by both the RBF model density field and the residual density field.

At block 410, the process renders an image of the inhomogeneous scattering medium based on the effective exitant radiance.

As will be shown in further detail with exemplary embodiments, the source radiance may be computed by counting the single scattering term only. For more accurate and more realistic rendering, however, the source radiance is preferably computed to include both the single scattering term and multiple scattering terms.

Figure 5:
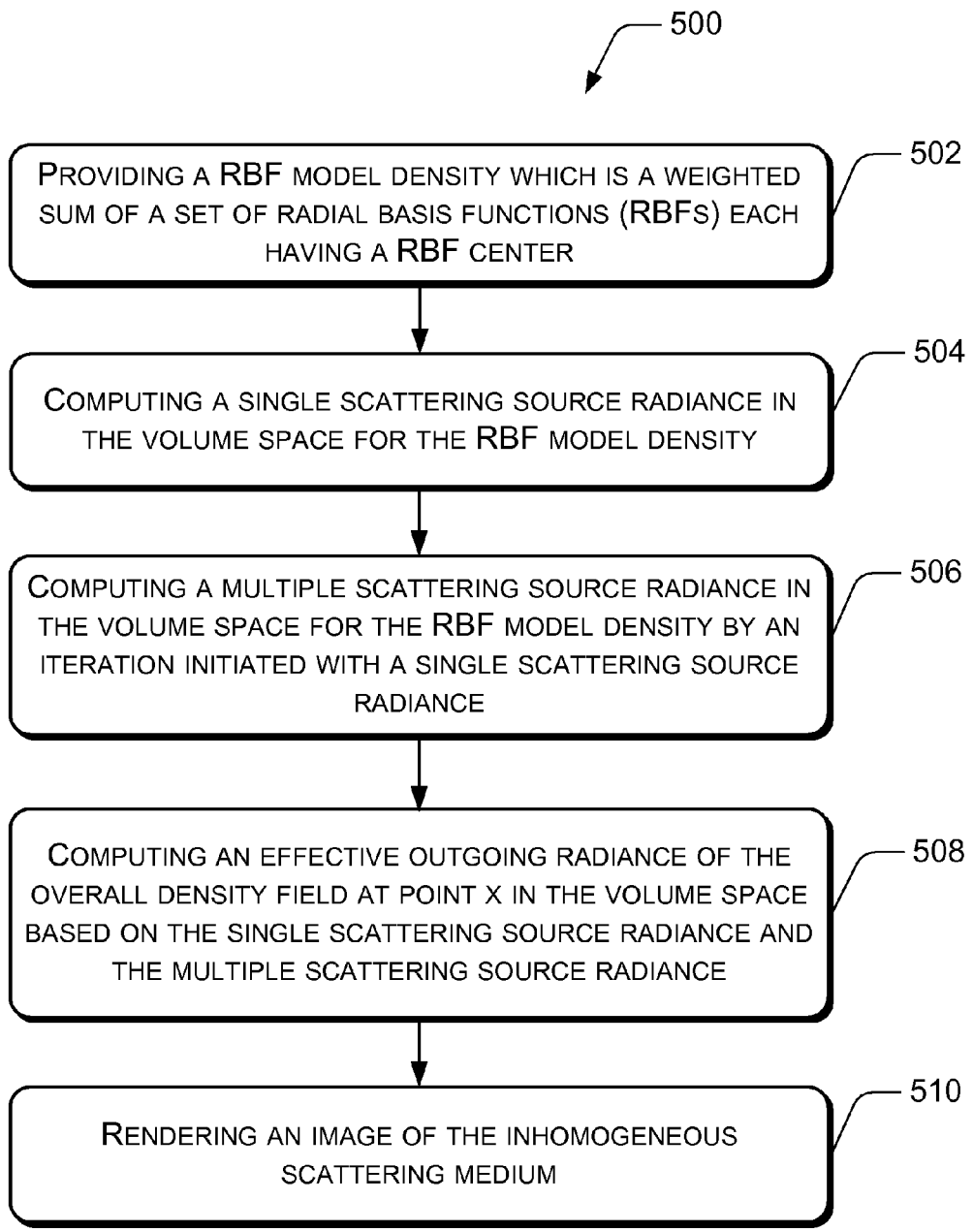
FIG. 5 is a flowchart of another exemplary process of rendering an inhomogeneous scattering medium.

FIG. 5 is a flowchart of another exemplary process of rendering an inhomogeneous scattering medium. In this exemplary process, the RBF model density field may either be an exact representation of the actual density or only an approximation of an actual density. In the latter case, a residual density field may be used to compensate the RBF model density field to more closely simulate the actual density field.

The process 500 starts at block 502 at which a RBF model density field is provided. The RBF model density field is a weighted sum of a set of radial basis functions (RBFs) each having a RBF center. The RBF model density field may be provided in various manners and circumstances. For example, the RBF model density field may have been previously acquired as a result of decomposing an actual density field. The decomposition of the actual density field may either be done in the same process 500 of FIG. 5, or in a different process at a different location by a different party.

At block 504, the process computes single scattering source radiance in the volume space for the RBF model density field. To simplify the computation, single scattering source radiance may be computed at RBF centers first and then interpolated to approximate the source radiance at other points in the volume space.

At block 506, the process computes multiple scattering source radiance in the volume space for the RBF model density field by an iteration initiated with the single scattering source radiance. To simplify the computation, the multiple scattering source radiance may be computed at RBF centers first and then interpolated to approximate the source radiance at other points in the volume space.

At block 508, the process computes effective exitant radiance at point x in the volume space based on the multiple scattering source radiance.

At block 510, the process renders an image of the inhomogeneous scattering medium based on the effective exitant radiance.

The techniques described herein may be used for rendering a variety of inhomogeneous scattering media, and is particularly suitable for rendering smoke in video games in which the smoke is a part of a video or animation having a sequence of renderings of images each rendered at a short time interval (e.g., 1/20 sec to result in 20 frames per second). In such renderings, as many as possible runtime blocks are preferably performed in real time at each time interval. For example, in some embodiments, blocks 110-130 of FIG. 1, blocks 206-210 of FIG. 2, blocks 304-310 of FIG. 3, blocks 404-410 of FIG. 4, and blocks 504-510 of FIG. 5 are performed in real time. Preferably, other blocks may also be performed in real time to enable interactive changing of lighting, viewpoint and scattering parameters. But if unable to be performed in real time, some steps may be precomputed before the rendering.

For computing the single scattering term, a technique is herein described for computing a transmittance vector $\tilde{\tau}(c_l)$ associated with RBF center ca. For example, a spherical harmonic product and a convolution term $[(L_{in}*\tilde{\tau}(c_l))*p]$ is computed to obtain the single scattering, wherein $L_{in}$ is a vector representing a spherical harmonic projection of incident radiance $L_{in}$, $\tilde{\tau}(c_l)$ is transmittance vector associated with RBF center $c_l$, and p is a vector representing a spherical harmonic projection of phase function p. The notation and further detail are described later with exemplary embodiments.

For computing the source radiance contributed by the multiple scattering, an iteration techniques using a recursive formula is herein described in which a $n^{th}$ order scattering term ($n \geq 1$) is first computed, and a $(n+1)^{th}$ order scattering term is then computed based on the previously computed $n^{th}$ order scattering term. In one embodiment, a first order, second order ..., $n^{th}$ order, and $(n+1)^{th}$ scattering terms are computed reiteratively, until the last scattering term has a magnitude below a user-specified threshold, or a user-specified number of iterations has been reached.

Once the source radiance(s) are obtained, the effective exitant radiance (blocks 108, 208, 308, 408 and 508) may be obtained using a variety of suitable techniques. In one embodiment, a ray marching technique is used to accomplish this. The ray marching technique decomposes the volume space into N ($\geq 2$) slices of a user-controllable thickness $\Delta u$ stacking along a current view direction, and calculates slice by slice a discrete integral of the source radiance arriving at the point x along the current view direction to obtain the effective exitant radiance.

The above-described analytical framework may be implemented with the help of a computing device, such as a personal computer (PC) or a game console.

Figure 6:
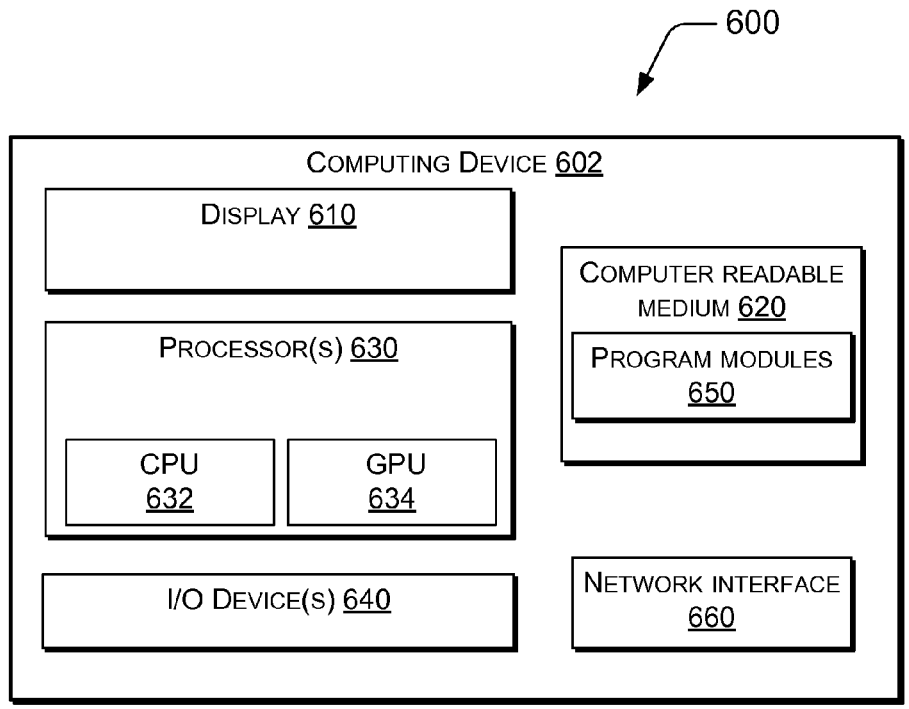
FIG. 6 shows an exemplary environment for implementing the method for rendering inhomogeneous scattering media.

FIG. 6 shows an exemplary environment for implementing the method for rendering inhomogeneous scattering media. The system 600 is based on a computing device 602 which includes display 610, computer readable medium 620, processor(s) 630, and I/O devices 640. Program modules 650 are implemented with the computing device 600. Program modules 650 contains instructions which, when executed by a processor(s), cause the processor(s) to perform actions of a process described herein (e.g., the processes of FIGS. 1-5) for rendering an inhomogeneous scattering medium.

For example, in one embodiment, computer readable medium 620 has stored thereupon a plurality of instructions that, when executed by one or more processors 630, causes the processor(s) 630 to:

(1) compute an approximate source radiance based on an approximate model density field;

(2) compute an effective exitant radiance by compositing the approximate source radiance; and (3) render an image of an inhomogeneous scattering medium based on the effective exitant radiance.

In one embodiment, the RBF model density field is an approximation of the density field of the inhomogeneous scattering medium, and the above computation compensates the effective exitant radiance by taking into account a contribution of a residual density field. The residual density field compensates for the difference between the density field and the RBF model density field.

In one embodiment, the inhomogeneous scattering medium is a part of a video or animation. At least some runtime components, such as the above steps (2) and (3) are performed in real time at each time interval during a runtime. Preferably, other blocks may also be performed in real time to enable interactive changing of lighting, viewpoint and scattering parameters.

To accomplish real-time rendering, processor(s) 630 preferably include both a central processing unit (CPU) and a graphics processing unit (GPU). For speedier rendering, as many as runtime components are preferably implemented with the GPU.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a PC, a game console, a set top box, and a computing unit built in another electronic device such as a television, a display, a printer or a digital camera.

ALGORITHMS AND EXEMPLARY EMBODIMENTS

Further detail of the techniques for rendering an inhomogeneous scattering medium is described below with theoretical background of the algorithms and exemplary embodiments. The techniques described herein are particularly suitable for real-time rendering of smoke in a low-frequency environment light, as illustrated below.

Notation and Background:

TABLE 1 lists the notation used in this description.

TABLE 1

| | Notation |
|---|---|
| x | A point in the 3D volume space |
| s, ω | Direction |
| $x_\omega$ | A point where light enters the medium along direction ω |
| $\omega_i, \omega_o$ | Incident, exitant radiance direction |
| S | Sphere of directions |
| D(x) | Medium (smoke) density |
| $\tilde{D}(x)$ | Model density field or approximation density |
| R(x) | Residual density |
| $\sigma_t$ | Extinction cross section |
| $\sigma_s$ | Scattering cross section |
| Ω | Single-scattering albedo, computed as $\sigma_s/\sigma_t$ |
| $\kappa_t(x)$ | Extinction coefficient, computed as $\sigma_t D(x)$ |
| $\tau(u, x)$ | Transmittance from u to x, computed as $\exp\left(-\int_u^x \kappa_t(v)dv\right)$ |
| $\tau_\infty(x, \omega)$ | Transmittance from infinity to x from direction ω, computed as $\exp\left(-\int_x^{\infty\omega} \kappa_t(v)dv\right)$ |
| $L_{in}(\omega)$ | Environment map |
| $L_{out}(x, \omega)$ | Exitant (outgoing) radiance |

TABLE 1-continued

Notation

| | |
|---|---|
| $L_d$ | Reduced incident radiance |
| $L_m$ | Medium radiance |
| $J(x, \omega)$ | Source radiance |
| $J_{ss}$ | Source radiance contributed by single scattering |
| $J_{ms}$ | Source radiance contributed by multiple scattering |
| $p(\omega_o, \omega_i)$ | Phase function |
| $y(s)$ | Set of spherical harmonic basis functions |
| $y_i(s), y_l^m(s)$ | Spherical harmonic basis function |
| $f_i, f_l^m$ | Spherical harmonic coefficient vector |

In this description, the lighting is represented as a low-frequency environment map $L_{in}$, described by a vector of spherical harmonic coefficients $L_{in}$. A sequence of density fields is used to model the input smoke animation. At each frame, the smoke density is denoted as $D(x)$.

The light transport in scattering media and operations on spherical harmonics are first described below.

Light Transport in Scattering Media—To describe light transport in scattering media, several radiance quantities are utilized, which are defined as in Cerezo, E., et al. "A Survey on Participating Media Rendering Techniques", the Visual Computer 21, 5, 303-328, 2005.

Figure 7:
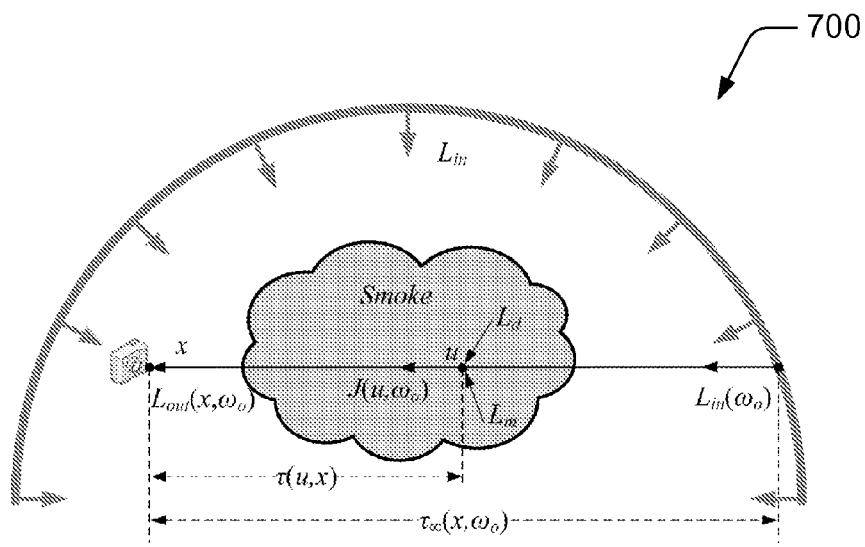
FIG. 7 is a diagrammatic illustration of light transport in smoke.

FIG. 7 is a diagrammatic illustration of light transport in smoke. As shown in FIG. 7, the exitant radiance at a point x is composed of the reduced incident radiance $L_d$ and the medium radiance $L_m$:

$$L_{out}(x, \omega_o) = L_d(x, \omega_o) + L_m(x, \omega_o).$$

The reduced incident radiance represents incident radiance $L_{in}$ along direction $\omega_o$ that has been attenuated by the medium before arriving at x:

$$L_d(x, \omega_o) = \tau_\infty(x, \omega_o) L_{in}(\omega_o). \quad (1)$$

The medium radiance $L_m$ is the integration of the source radiance J that arrives at x along direction $\omega_o$ from points within the medium:

$$L_m(x, \omega_o) = \int_{x_{\omega_o}}^x \tau(u, x) \sigma_t D(u) J(u, \omega_o) du.$$

In non-emissive media such as smoke, this source radiance J is composed of a single scattering $J_{ss}$ and multiple scattering $J_{ms}$ component:

$$J(u, \omega_o) = J_{ss}(u, \omega_o) + J_{ms}(u, \omega_o).$$

The single scattering term, $J_{ss}$, represents the first scattering interaction of the reduced incident radiance:

$$J_{ss}(u, \omega_o) = \frac{\Omega}{4\pi} \int_S L_d(u, \omega_i) p(\omega_o, \omega_i) d\omega_i. \quad (2)$$

The multiple scattering term, $J_{ms}$, accounts for scattering of the medium radiance:

$$J_{ms}(u, \omega_o) = \frac{\Omega}{4\pi} \int_S L_m(u, \omega_i) p(\omega_o, \omega_i) d\omega_i. \quad (3)$$

Spherical Harmonics—Low-frequency spherical functions can be efficiently represented in terms of spherical harmonics (SHs). A spherical function $f(s)$ can be projected onto a basis set $y(s)$ to obtain a vector f that represents its low-frequency components:

$$f = \int_s f(s) y(s) ds. \quad (4)$$

An order-n SH projection has $n^2$ vector coefficients. With these coefficients, one can reconstruct a spherical function $\tilde{f}(s)$ that approximates $f(s)$:

$$\tilde{f}(s) = \sum_{i=0}^{n^2-1} f_i y_i(s) = f \cdot y(s). \quad (5)$$

The SH triple product, denoted by f*g, represents the order-n projected result of multiplying the reconstructions of two order-n vectors:

$$f * g = \int_S f(s) g(s) y(s) ds \Rightarrow (f * g)_i = \sum_{j,k} \Gamma_{ijk} f_j g_k,$$

where the SH triple product tensor $\Gamma_{ijk}$ is defined as $$\Gamma_{ijk} = \int_s y_i(s) y_j(s) y_k(s) ds.$$

$\Gamma_{ijk}$ is symmetric, sparse, and of order 3.

SH convolution, denoted by f*g, represents the order-n projected result of convolving the reconstructions of two order-n vectors:

$$f * g = \int_S \int_S f(t) g(R_s(t)) y(s) dt ds \Rightarrow (f * g)_l^m = \sqrt{\frac{4\pi}{2l+1}} f_l^m g_l^0,$$

where g(s) is a circularly symmetric function, and $R_s$ is a rotation along the elevation angle towards direction s (i.e., the angle between the positive z-axis and direction s).

SH exponentiation, denoted by exp*(f), represents the order-n projected result of the exponential of a reconstructed order-n vector:

$$\exp*(f) = \int_s \exp(f(s)) y(s) ds.$$

This can be efficiently calculated on the GPU using the optimal linear approximation:

$$\exp_*(f) \approx \exp\left(\frac{f_0}{\sqrt{4\pi}}\right) (a(\|\hat{f}\|) 1 + b(\|\hat{f}\|) \hat{f}),$$

where $\hat{f} = (0, f_1, f_2, \ldots, f_{n^2-1})$, $1 = (\sqrt{4\pi}, 0, 0, \ldots, 0)$, and a, b are tabulated functions of the magnitude of input vector $\hat{f}$.

The above notation and background forms a basis for the algorithms described below.

The Algorithms:

The approach illustrated herein consists of a preprocessing step and a runtime rendering algorithm.

Figure 8:
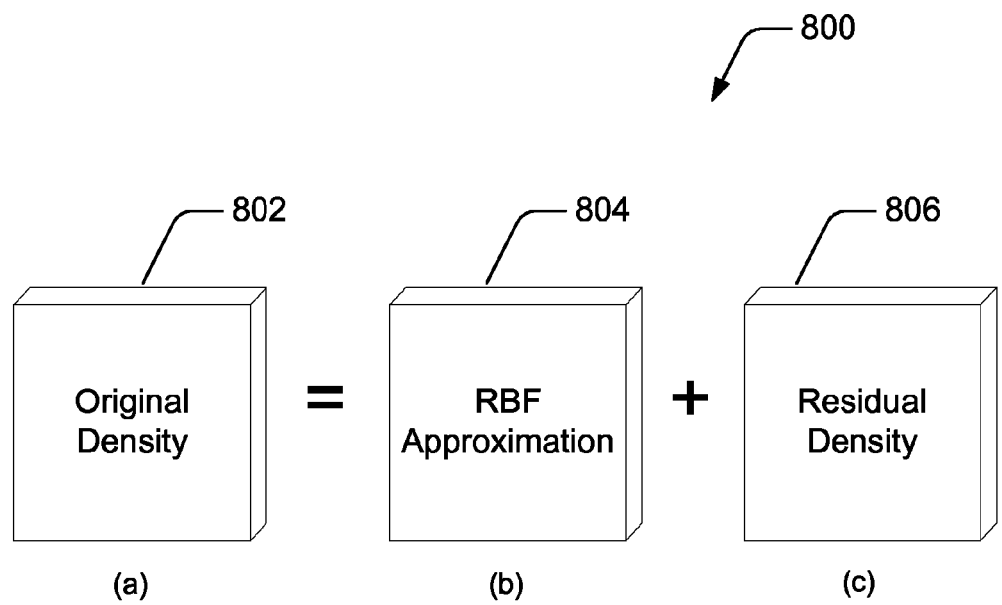
FIG. 8 is an illustration of density field approximation using a residual density field.

Preprocessing—Before the runtime rendering, an input density field is first processed using approximation, an example of which is illustrated in FIG. 8.

FIG. 8 is an illustration of density field approximation using a residual density field. Original volume density D(x) 802 is shown to be the sum of RBF model density field (RBF approximation) $\tilde{D}(x)$ 804 and residual density R(x) 806, which is scaled by sixteen times for better viewing. Residual density R(x) 806 has both positive residuals is negative residuals.

The ordinal density field D(x) is first decomposed into a weighted sum of RBFs $B_l(x)$ and a residual R(x):

$$D(x) = \tilde{D}(x) + R(x) = \sum_l w_l B_l(x) + R(x).$$

Each RBF $B_l(x)$ is defined by its center $c_l$ and radius $r_l$:

$$B_l(x) = G(\|x - c_l\|, r_l),$$

where $G(t, \lambda)$ is a radial basis function. An exemplary radio basis function suitable for the above decomposition is:

$$G(t, \lambda) = \begin{cases} 1 - \frac{22t^2}{9\lambda^2} + \frac{17t^4}{9\lambda^4} - \frac{4t^6}{9\lambda^6}, & \text{if } t \leq \lambda; \\ 0, & \text{otherwise.} \end{cases}$$

These RBFs are approximately Gaussian in shape, have local support, and are $C^1$ continuous.

The RBF model density field $\tilde{D}(x)$ represents a low-frequency approximation of the smoke density field. In general, the residual density R(x) contains a relatively small number of significant values. To promote compression, the values of R(x) below a given threshold may be made to zero, such that the residual becomes sparse.

Runtime—In a participating media simulation, the computational expense mainly lies in the evaluation of source radiances J from the density field D. To expedite this process, an approximation $\tilde{J}$ of the source radiances from the RBF model $\tilde{D}$ of the density field may be computed. In one specific embodiment, $\tilde{J}$ due to single and multiple scattering at only the RBF centers $c_l$ is computed as follows:

$$\tilde{J}(c_l) = \tilde{J}_{ss}(c_l) + \tilde{J}_{ms}(c_l).$$

The source radiance at any point x in the medium may be interpolated from $\tilde{J}(c_l)$ due to single and multiple scattering at only the RBF centers $c_l$. An exemplary interpolation is to approximate the source radiance at any point x as a weighted combination of the source radiances at these centers:

$$J(x, \omega_o) \approx \tilde{J}(x, \omega_o) = \frac{1}{\tilde{D}(x)} \sum_l w_l B_l(x) \tilde{J}(c_l, \omega_o).$$

The single scattering and multiple scattering source radiances in a smoke volume may be used as a rough approximation to render images of the medium (smoke). For volumetric rendering, source radiances (single scattering and/or multiple scattering) are integrated along the view ray for the final rendering. In some embodiments, ray marching method as described herein may be used for such integration after computation of source radiances. The ray marching process is to compute the medium radiance $L_m(x, \omega_o)$ by gathering radiance contributions towards the viewpoint. The medium radiance $L_m(x, \omega_o)$ is further used to compute the final exitant radiance $L_{out}(x, \omega_o)$. Further detail of the ray marching process is discussed in a later section of this description.

In computing the medium radiance $L_m(x, \omega_o)$, various degrees of approximation may be taken. A basic level (zero order) approximation is to take component $\tilde{L}_m$ computed from the approximated source radiances $\tilde{J}$ and the RBF density model as the medium radiance $L_m(x, \omega_o)$. At high levels of approximation, radiance contributions including the component $\tilde{L}_m$ and a component $\tilde{C}_m$ that compensates for the density field residual may be taken into account:

$$L_m(x, \omega_o) \approx \tilde{L}_m(x, \omega_o) + \tilde{C}_m(x, \omega_o) \quad (6)$$

$$= \sum_{j=1}^{N} \tilde{\tau}(x_j, x) \sigma_t \tilde{D}(x_j) \tilde{J}(x_j, \omega_o) +$$

$$\sum_{j=1}^{N} \tilde{\tau}(x_j, x) \sigma_t R(x_j) \tilde{J}(x_j, \omega_o),$$

where $\tilde{\tau}$ denotes transmittance values computed from $\tilde{D}$, and $x_j$ indexes a set of N uniformly distributed points between $x_{\omega_o}$ and x. The above approximation described in equation (6) may be seen as a first order approximation.

The compensation term $\tilde{C}_m$ brings into the ray march the extinction effects of the density residuals, resulting in a significant improvement over the zero order approximation. Theoretically, transmittance $\tau$ computed from exact density D (rather than the approximate transmittance $\tilde{\tau}$ computed from the RBF approximate density $\tilde{D}$) and the exact source radiance J (rather than the approximate source radiance $\tilde{J}$) may be used for an even higher order of approximation. However, the improvement over the first order approximation may not worth the increased computational cost.

Due to its size, a density field D cannot in general be effectively processed on the GPU. However, the decomposition of a density field into an RBF approximation and a residual field leads to a considerable reduction in data size. Because of its sparsity, it is observed that the residual can be highly compressed using hashing such as the perfect spatial hashing technique. In addition to providing manageable storage costs, perfect spatial hashing also offers fast reconstruction of the residual in the ray march. By incorporating high-frequency smoke details in this manner, high-quality smoke renderings can be generated.

With the above formulation, it is possible to obtain real-time performance with high visual fidelity by accounting for the cumbersome residual field only where it has a direct impact on Eq. (6), namely, in the smoke density values. For these smoke densities, the residual can be efficiently retrieved from the hash table using perfect spatial hashing. In the other factors of Eq. (6), the residual has only an indirect effect and also cannot be rapidly accounted for. Therefore, some embodiments may exclude the residuals from computations of source radiances and transmittances to significantly speed up processing without causing significant degradation of smoke appearance, as will be shown in the next section.

Further Algorithm Detail:

Density Field Approximation—Given the number n of RBFs, an optimal approximation of the smoke density field may be computed by solving the following minimization problem:

$$\min_{c_\ell, r_\ell, w_\ell} \left( \sum_{j,k,l} \left[ D(x_{jkl}) - \sum_{\ell=1}^{n} w_\ell B_\ell(x_{jkl}) \right]^2 \right), \quad (7)$$

where (j, k, l) indexes a volumetric grid point at position $x_{jkl}$. For optimization, the algorithm may employ the L-BFGS-B minimizer, which has been used by others to fit spherical RBFs to a lighting environment, and to fit zonal harmonics to a radiance transfer function.

Since L-BFGS-B is a derivative-based method, at each iteration one needs to provide the minimizer with the objective function and the partial derivatives for each variable. For the objective function $$f(\{c_\ell, r_\ell, w_\ell\}_{\ell=1\ldots n}) = \sum_{j,k,l} \left( D(x_{jkl}) - \tilde{D}(x_{jkl}) \right)^2,$$

the partial derivatives for each parameter are given by $$\frac{\partial f}{\partial v} = \sum_{j,k,l} 2 \left( D(x_{jkl}) - \tilde{D}(x_{jkl}) \right) \left( -\frac{\partial \tilde{D}}{\partial v} \right)$$

where v denotes a variable in $\{c_l, r_l, w_l\}_{l=1\ldots n}$. The partial derivatives of $\tilde{D}$ with respect to each variable are $$\frac{\partial \tilde{D}}{\partial c_\ell} = w_\ell \left( \frac{44\Delta_\ell}{9r_\ell^2} - \frac{68\Delta_\ell \|\Delta_\ell\|^2}{9r_\ell^4} + \frac{8\Delta_\ell \|\Delta_\ell\|^4}{3r_\ell^6} \right),$$

$$\frac{\partial \tilde{D}}{\partial r_\ell} = w_\ell \left( \frac{44\|\Delta_\ell\|^2}{9r_\ell^3} - \frac{68\|\Delta_\ell\|^4}{9r_\ell^5} + \frac{8\|\Delta_\ell\|^6}{3r_\ell^7} \right),$$

$$\frac{\partial \tilde{D}}{\partial w_\ell} = G(\|\Delta_\ell\|, r_\ell),$$

where $\Delta_\ell = x_{jkl} - c_\ell$.

Evaluation of these quantities requires iterating over all voxels in the volume, $100^3$-$128^3$ for the examples in this paper. To reduce computation, one may take advantage of the sparsity of the smoke data by processing only voxels within the support range of an RBF. To avoid entrapment in local minima at early stages of the algorithm, one may also employ a teleportation scheme, where the algorithm records the location of the maximum error during the approximation procedure and then moves the most insignificant basis function there. In one example, teleportations are utilized at every 20 iterations of the minimizer, and when the minimizer converges the most insignificant RBF is teleported alternatingly to the location of maximum error or to a random location with non-zero data. The inclusion of teleportation into the minimization process often leads to a further reduction of the objective function by 20%-30%.

Depending on the smoke density distribution in each frame, a different number n of RBFs may be utilized to provide a balance between accuracy and efficiency. One exemplary embodiment starts with a large number (1000) of RBFs in each frame, then after optimization by Eq. (7) merges RBFs that are in close proximity. For example, $B_l$ and $B_h$ are merged together if their centers satisfy the condition $\|c_l - c_h\| < \epsilon$. The center of the new RBF is then taken as the midpoint between $c_l$ and $c_h$. After this merging process, fix the RBF centers and optimize again with respect to only $r_l$ and $w_l$. In one exemplary implementation, $\epsilon$ is set to $2\Delta$, where $\Delta$ is the distance between neighboring grid points in the volume.

To accelerate this process, one exemplary embodiment takes advantage of the temporal coherence in smoke animations by initializing the RBFs of a frame with the optimization result of the preceding frame before merging. For the first frame, the initialization is generated randomly.

Residual Field Compression—After computing the RBF approximation of the density field, the residual density field $R(x)=D(x)-\tilde{D}(x)$ may be compressed for faster GPU processing. While the residual field is of the same resolution as the density field, it normally consists of small values. Entries in $R(x)$ below a given threshold (e.g., 0.005-0.01) may be made zero, and the resulting sparse residual field is compressed using a hashing technique such as the perfect spatial hashing, which is lossless and ideally suited for parallel evaluation on graphics hardware.

One exemplary implementation of perfect spatial hashing utilizes a few modifications tailored to rendering inhomogeneous scattering media. Unlike in some cases where nonzero values in the data lie mostly along the surface of a volume, the nonzero values in the residual fields for smoke may be distributed throughout the volume. Larger offset tables are therefore needed, and as a result the initial table size is set to an exemplary $$\sqrt[3]{K/3} + 9$$

(K is the number of nonzero items in the volume), instead of $$\sqrt[3]{K/6}$$

used by others.

One exemplary technique for processing a sequence of residual fields is to tile several consecutive frames into a larger volume on which hashing is conducted. Since computation is nonlinear to the number of domain slots, it may be advantageous to construct a set of smaller hash volumes instead of tiling all the frames into a single volume. With smaller hash volumes, the technique may also avoid the precision problems that arise in decoding the domain coordinates of large packed volumes. In one exemplary implementation, $3^3=27$ frames per volume are tiled.

Single Scattering—To promote runtime performance, source radiance values in the smoke volume may be calculated using $\tilde{D}$, the low-frequency RBF approximation of the density field. For example, single scattering at the RBF centers may be computed according to Eq. (2):

$$\tilde{J}_{ss}(c_\ell, \omega_o) = \frac{\Omega}{4\pi} \int_S \tilde{L}_d(c_\ell, \omega_i) p(\omega_o, \omega_i) d\omega_i \quad (8)$$

$$= \frac{\Omega}{4\pi} \int_S L_{in}(\omega_i) \tilde{\tau}_\infty(c_\ell, \omega_i) p(\omega_o, \omega_i) d\omega_i,$$

where $$\tilde{\tau}_\infty(c_\ell, \omega_i) = \exp\left(-\int_{c_\ell}^{\infty \omega_i} \sigma_t \tilde{D}(u) du\right)$$

is the approximated transmittance along direction $\omega_i$ from infinity to $c_l$.

In scattering media, phase functions are often well-parameterized by the angle $\theta$ between the incoming and outgoing directions. For computational convenience, one may therefore rewrite $p(\omega_o, \omega_i)$ as a circularly symmetric function $p(z)$, where $z=\cos \theta$. With this reparameterization of the phase function, Eq. (8) can be efficiently computed using the SH triple product and convolution:

$$\tilde{J}_{ss}(c_\ell) = \frac{\Omega}{4\pi}[(L_{in} * \tilde{\tau}(c_\ell)) * p]. \quad (9)$$

$L_{in}$ and p may be precomputed according to Eq. (4). The transmittance vector $\tilde{\tau}(c_l)$ may be computed on the fly using efficient techniques described as follows.

Computing the transmittance vector $\tilde{\tau}(c_l)$: Expressing transmittance directly in terms of the RBFs, one has $$\tilde{\tau}(c_\ell, \omega_i) = \exp\left(-\sigma_t \sum_h w_h \int_{c_\ell}^{\infty \omega_i} B_h(u) du\right)$$
$$= \exp\left(-\sigma_t \sum_h w_h T_h(c_\ell, \omega_i)\right),$$

where $T_h(c_l,\omega_i)$ is the accumulative optical depth through RBF $B_h$. $\tilde{\tau}(c_l)$ can then be computed as $$\tilde{\tau}(c_\ell) = \exp_*\left(-\sigma_t \sum_h w_h T_h(c_\ell)\right),$$

where $T_h(c_l)$ is the SH projection of $T_h(c_l,\omega_i)$, and $\sigma_t$ is the extinction cross section.

Figure 9:
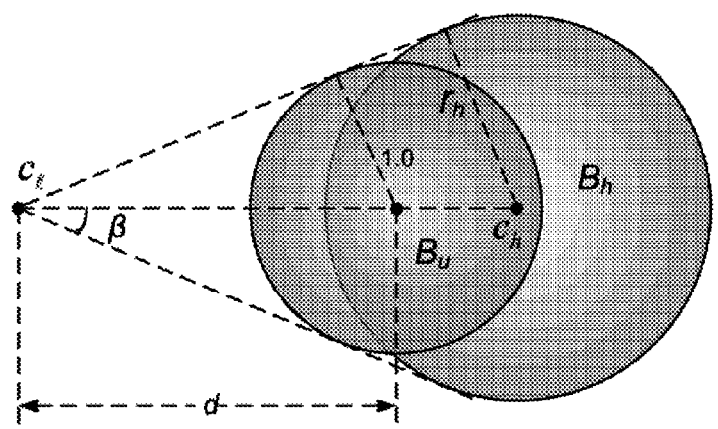
FIG. 9 is a diagram showing an accumulative optical depth of an RBF.

FIG. 9 is a diagram showing an accumulative optical depth of an RBF B. The accumulated optical depth is shown to be determined by the angle $\beta$ subtended by half the RBF and its absolute radius r. For fast evaluation, the precomputed value for a unit-radius RBF $B_u$ with angle $\beta$ is retrieved, rotated, and then multiplied by r.

For efficient determination of $T_h(c_l)$, the accumulative optical depth vector $T(\beta)$ may be tabulated with respect to angle $\beta$, equal to half the subtended angle of a unit-radius RBF $B_u$ as illustrated in FIG. 9. Note that $\beta$ ranges from 0 to $\pi$:

$$\beta = \begin{cases} \arcsin(1/d), & \text{if } d > 1 \\ \arccos(d) + \pi/2, & \text{otherwise} \end{cases}$$

where d is the distance from $c_l$ to the center of $B_u$. Since the RBF kernel function G is symmetric, this involves a 1D tabulation of zonal harmonic (ZH) vectors.

At runtime, ZH vectors $T(\beta_{l,h})$ are retrieved from the table, where $\beta_{l,h}$ is half the angle subtended by RBF $B_h$ as seen from $c_l$. $T_h(c_l)$ is then computed by rotating $T(\beta_{l,h})$ to the axis determined by $c_l$ and $c_h$, followed by a multiplication with the radius $r_h$.

Computation of the transmittance vector $\tilde{\tau}(c_l)$ is then straightforward. For each RBF center, the computation iterates through the RBFs. Their accumulative optical depth vectors are retrieved, rotated, scaled, and summed up to yield the total optical depth vector. Finally, the accumulative optical depth is multiplied by the negative extinction cross section $\sigma_t$ and exponentiated to yield the transmittance vector $\tilde{\tau}(c_l)$. With this transmittance vector, the source radiance due to single scattering is computed from Eq. (9)

The single scattering approximation yields results similar to those obtained from ray tracing. For a clearer comparison, ray tracing was performed with the approximated density field $\tilde{D}(x)$, and compared with the single scattering result. In rendering the single scattering image, the ray marching algorithm described in a later section of the present description is used but without accounting for the residual.

Multiple Scattering—Source radiance $J_{ms}$ due to multiple scattering is expressed in Eq. (3). In evaluating $J_{ms}$, one exemplary approach is to first group light paths by the number of scattering events they include:

$$J_{ms}(x,\omega_o) = J_{ms}^2(x,\omega_o) + J_{ms}^3(x,\omega_o) + \ldots$$

$J_{ms}^k$ represents source radiance after k scattering events, computed from medium radiance that has scattered k−1 times:

$$J_{ms}^k(x, \omega_o) = \frac{\Omega}{4\pi}\int_S L_m^{k-1}(x, \omega_i) p(\omega_o, \omega_i) d\omega_i,$$

where $$L_m^{k-1}(x, \omega_o) = \int_{x\omega_o}^x \tau(u, x) \sigma_t D(u) J_{ms}^{k-1}(u, \omega_o) du.$$

In this recursive computation, one may use the single scattering source radiance to initialize the procedure:

$$L_m^1(x, \omega_o) = \int_{x\omega_o}^x \tau(u, x) \sigma_t D(u) J_{ss}(u, \omega_o) du.$$

Multiple scattering computed above provides a more accurate simulation of the scattering between RBFs than single scattering alone.

In the SH domain, this scheme proceeds as follows. The algorithm first computes at each RBF center the initial radiance distributions from single scattering:

$$I^1(c_\ell) = L_{in} * \tilde{\tau}(c_\ell)$$
$$\tilde{J}_{ms}^1(c_\ell) = \tilde{J}_{ss}(c_\ell) = \frac{\Omega}{4\pi}(I^1(c_\ell) * p)$$
$$E^1(c_\ell) = \tilde{J}_{ms}^1(c_\ell),$$

where I and E represent incident and exitant radiance, respectively. Then at each iteration k, the three SH vectors are updated according to $$I^k(c_\ell) = H(\{E^{k-1}(c_h)\})$$

-continued $$\tilde{J}_{ms}^k(c_\ell) = \frac{\alpha(c_\ell)\Omega}{4\pi}(I^k(c_\ell) * p)$$

$$E^k(c_\ell) = (1 - \alpha(c_\ell))I^k(c_k) + \tilde{J}_{ms}^k(c_\ell).$$

Intuitively, one may evaluate the incident radiance from the exitant radiance of the preceding iteration using a process H, which will be explained later in detail, then compute the scattered source radiance by convolving the incident radiance with the phase function. Here, $\alpha(c_l)$ is the opacity of RBF $B_l$ along its diameter (i.e., the scattering probability of $B_l$), computed by, for example, $\alpha(c_l) = 1 - e^{-1.7\sigma_l \omega_l r_l}$. Finally, one may add the scattered source radiance to the transmitted radiance to yield the exitant (outgoing) radiance.

The simulation runs until the magnitude of $E^{k+1}(c_l)$ falls below a user-specified threshold, or until a user-specified number of iterations is reached. In some exemplary implementations, this process typically converges in 5-10 iterations.

Estimation of Incident Radiance $I^k(c_l)$: The process H mentioned earlier for estimating incident radiance is explained as follows. To estimate the incident radiance at an RBF center $c_l$, one may consider each of the RBFs in its neighborhood as a light source that illuminates $c_l$, as illustrated in FIG. 10.

Figure 10:
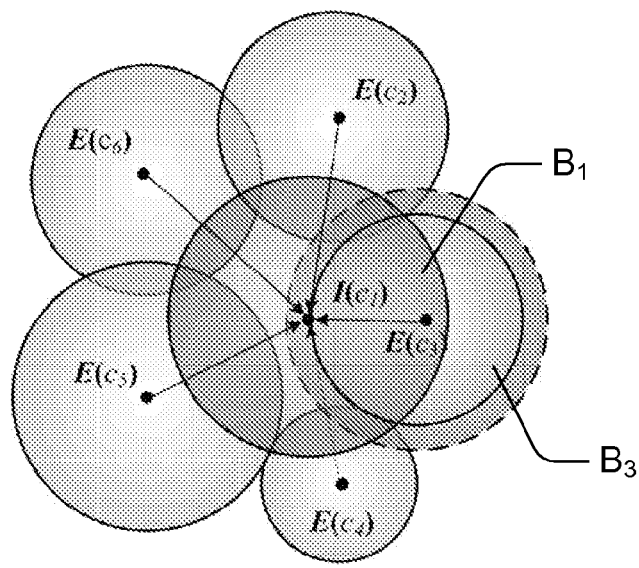
FIG. 10 is an illustration of an exemplary multiple scattering simulation for estimation of incident radiance at RBF center $c_1$.

FIG. 10 is an illustration of an exemplary multiple scattering simulation for estimation of incident radiance at RBF center $c_1$ of RBF $B_1$.

The illumination from RBF $B_h$ is approximated as that from a uniform spherical light source, whose intensity $E_{l,h}^{k-1}$ in direction $c_l - c_h$ is reconstructed from the SH vector $E^{k-1}(c_h)$ using Eq. (5):

$$E_{l,h}^{k-1} = E^{k-1}(c_h) \cdot y(s(c_l, c_h)),$$

where $$s(c_\ell, c_h) = \frac{c_\ell - c_h}{\|c_\ell - c_h\|}$$

represents the direction from $c_h$ to $c_l$.

The SH vector for a uniform spherical light source can be represented as a zonal harmonic vector, and tabulated with respect to the angle θ, equal to half the subtended angle by a spherical light source of unit radius. Unlike β in a single scattering, θ ranges from 0 to π/2 such that $c_l$ does not lie within a light source. From this precomputed table, one can retrieve the SH vector using the angle $\theta_{l,h}$, which is half the angle subtended by RBF $B_h$ as seen from point $c_l$:

$$\theta_{\ell,h} = \begin{cases} \arcsin(r_h / \|c_\ell - c_h\|), & \text{if } \|c_\ell - c_h\| > r_h; \\ \pi/2, & \text{otherwise.} \end{cases}$$

Note that in FIG. 10, the angle $\theta_{1,3}$ (θ with respect to RBFs $B_1$ and $B_3$) is equal to π/2 because $c_1$ of RBF $B_1$ is located within RBF $B_3$.

The vector is then rotated to direction $c_l - c_h$, scale it by $\min(r_h, \|c_l - c_h\|)$ to account for RBF radius, and finally multi ply it by the intensity $E_{l,h}^{k-1}$ to obtain the SH vector $I_{l,h}^k$. The incident radiance $I^k(c_l)$ at $c_l$ is then computed as:

$$I^k(c_l) = \sum_{\|c_l - c_h\| < \rho l} \tilde{\tau}(c_l, c_h) I_{l,h}^k,$$

where the parameter $\rho_l$ is used to adjust the neighborhood size. In one exemplary implementation, the default value of $\rho_l$ is $2r_l$.

The source radiance for different numbers of scattering events is aggregated to obtain the final source radiance due to multiple scattering:

$$\tilde{J}_{ms}(c_l) = \sum_{k=2} \tilde{J}_{ms}^k(c_l).$$

Combining this with the single-scattering component yields the final source radiance:

$$\tilde{J}(c_l) = \tilde{J}_{ss}(c_l) + \tilde{J}_{ms}(c_l).$$

Figure 11:
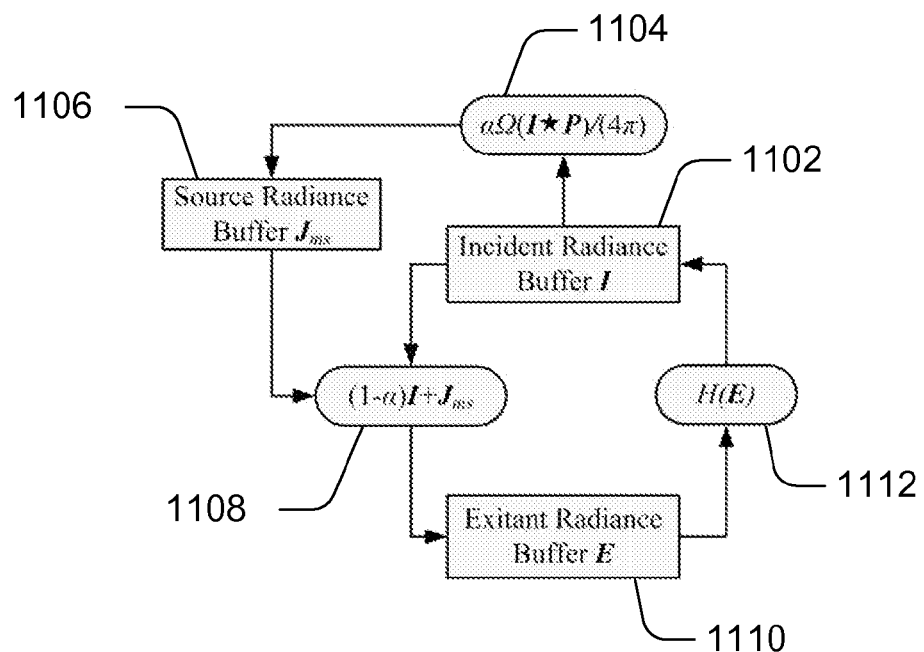
FIG. 11 is a flowchart of an exemplary GPU pipeline for multiple scattering simulation.

FIG. 11 is a flowchart of an exemplary GPU pipeline for multiple scattering simulation. This is a GPU implementation of the above-described multiple scattering simulation. The detail is further described in a later section for GPU implementation.

The multiple scattering result obtained using the above-described method has been compared with that from the offline algorithm for volumetric photon mapping. Although the algorithm described herein employs several approximations in the multiple scattering simulation, the two results are comparable in terms of image quality. In the comparison, one million photons are used in computing the volume photon map. A forward ray march is then performed to produce the photon map image.

Compensated Ray Marching—From the source radiances at the RBF centers, the source radiance of each voxel in the volume is obtained by interpolation as described herein. With the complete source radiance, one may perform a ray march to composite the radiances along each view ray.

Figure 12:
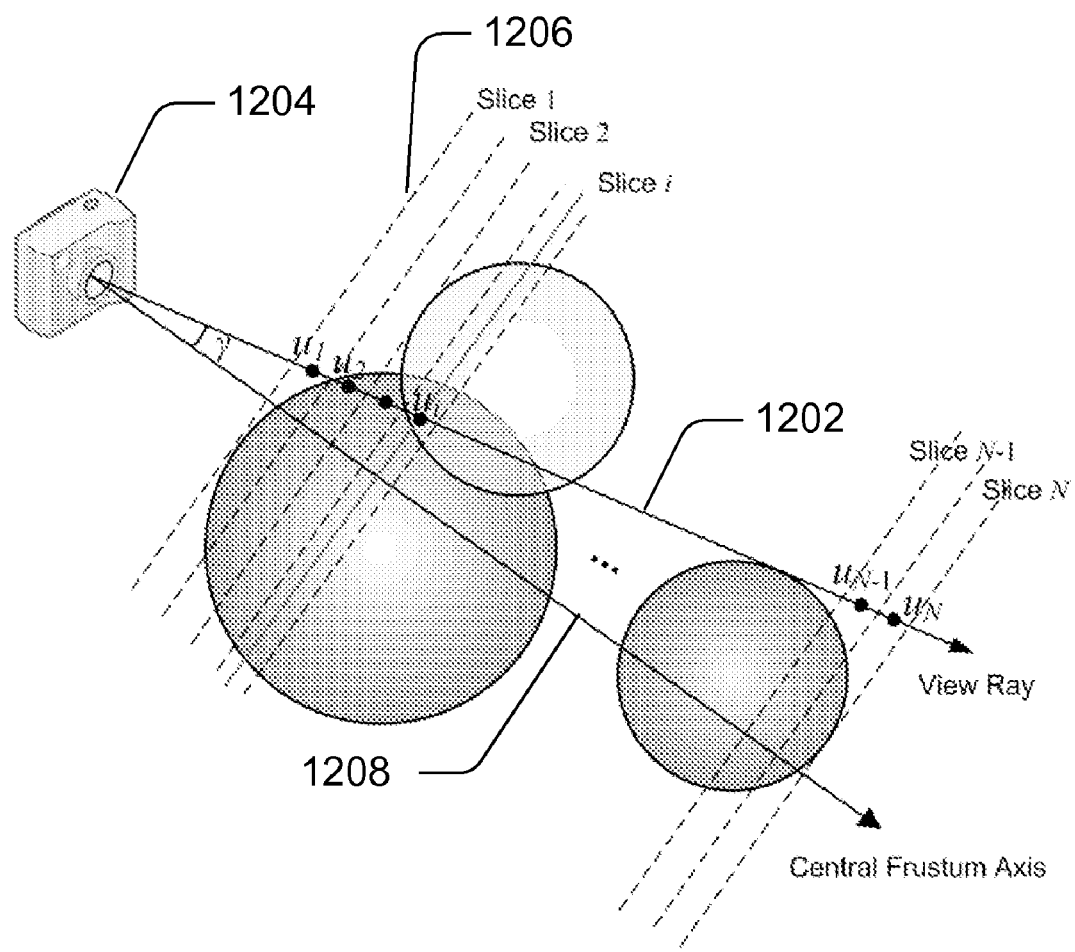
FIG. 12 is an illustration of an exemplary ray marching for radiance integration along view rays.

FIG. 12 is an illustration of an exemplary ray marching for radiance integration along view rays. To calculate the radiance of a view ray 1202, all voxels that the view ray 1202 intersects are traversed from back (the side close to the viewpoint 1204) to front (beside opposite to the viewpoint 1204). The initial radiance is set to that of the background. For each voxel traversed, the source radiance of the voxel is first added into the current radiance. The transmittance τ due to the voxel is computed and multiplied with the sum of the source radiance, weighted by the extinction cross section $\sigma_t$ and the medium density D at the voxel. This procedure is called compositing.

In compositing the source radiance, various degrees of approximation may be taken. In the most basic (zero order) approximation, the compositing may be based on a pure RBF approximation in which the source radiance, the transmittance and the density are all taken as that of a model RBF density. At the next level (first order) approximation, the density itself is compensated by a residual density while the source radiance and transmittance in which the residual density may only play an indirect role are taken as that of a model RBF density. The first order approximation has proven to have significantly better result than the zero order approximation. Higher orders of approximation may also be taken to result in a further improvement, but the improvement may be much less than the improvement made in the first order approximation and may not be worth the additional computational cost.

An example of ray marching using the above-described first order approximation to composite the source radiance is as follows:

$$L(x, \omega_o) = \tau(x_{\omega_o}, x)L_{in}(\omega_o) + \int_{x_{\omega_o}}^{x} \tau(u, x)\sigma_t D(u)J(u, \omega_o)du \quad (10)$$

$$\approx \tilde{\tau}(x_{\omega_o}, x)L_{in}(\omega_o) + \int_{x_{\omega_o}}^{x} \tilde{\tau}(u, x)\sigma_t D(u)\tilde{J}(u, \omega_o)du$$

$$= \tilde{\tau}(x_{\omega_o}, x)L_{in}(\omega_o) + \int_{x_{\omega_o}}^{x} \tilde{\tau}(u, x)\sigma_t \tilde{J}_D(u, \omega_o)du$$

where $$\tilde{J}_D(u, \omega_o) = D(u)\tilde{J}(u, \omega_o) \quad (11)$$

$$= D(u)\left(y(\omega_o) \cdot \frac{1}{\tilde{D}(u)} \sum_\ell w_\ell B_\ell(u) \tilde{J}(c_\ell)\right)$$

$$= \left(1 + \frac{R(u)}{\tilde{D}(u)}\right)\left(y(\omega_o) \cdot \sum_\ell w_\ell B_\ell(u) \tilde{J}(c_\ell)\right).$$

For efficient ray marching, the RBF volumes may be decomposed into N slices 1206 of user-controllable thickness Δu along the current view frustum, as shown in FIG. 12.

The discrete integral of Eq. (10) is calculated slice by slice from back to front:

$$L(x, \omega_o) = L_{in}(\omega_o) \prod_{j=1}^{N} \tilde{\tau}_j + \sum_{i=1}^{N}\left(\tilde{J}_D(u_i)\sigma_t \Delta u \prod_{j=i+1}^{N} \tilde{\tau}_j\right)$$

where $\{u_i\}$ contains a point from each slice that lies on the view ray, γ is the angle between the view ray and the central axis of the view frustum, $\tilde{\tau}_j$ is the transmittance of slice j along the view ray, computed as $$\tilde{\tau}_j = \exp(-\sigma_t \tilde{D}(u_j)\Delta u / \cos \gamma). \quad (12)$$

With compensated ray marching, rendering results are generated with fine details. A rendering based on the above compensated ray marching has been compared with a rendering result with a ray traced image. In the comparison, ray tracing is performed on the original density field, instead of the approximated RBF density field. The ray tracing result appears slightly smoother than the compensated ray marching result, perhaps because the compensated ray marching with a first order approximation accounts for the residual in the ray march but not in the scattering simulation. The two results are nevertheless comparable. However, the compensated ray marching techniques described herein is advantageous because it achieves real-time rendering, while in contrast, conventional ray tracing can only be performed off-line. The real-time rendering results have also been compared with the offline ray tracing with different lighting conditions to demonstrate that the real-time rendering described herein is able to achieve results comparable to that of the off-line ray tracing.

GPU Implementation—All run-time components of the algorithm described herein can be efficiently implemented on the GPU using pixel shaders. In the following, some implementation details are described.

Single Scattering: Source radiances are directly computed at only the RBF centers. For single scattering computation, one exemplary implementation rasterizes a small 2D quad in which each RBF is represented by a pixel. In some embodiments, approximated density model uses at most 1000 RBFs per frame, and accordingly a quad size of 32×32 is sufficient. The RBF data $(c_l, r_l, w_l)$ may be precomputed (e.g., either by a CPU on the same board with the GPU, or an external CPU) is packed into a texture and passed to the pixel shader.

In the shader, for each pixel (i.e., RBF center) the algorithm iterates through the RBFs to compute the transmittance vector $\tilde{\tau}(c_l)$ as described herein. Then the source radiance is computed using the SH triple product and convolution according to Eq. (9).

Multiple Scattering: an overview of the GPU pipeline for multiple scattering is depicted FIG. 11. The incident radiance buffer 1102 is initialized with the reduced incident radiance $I^1$ that has been calculated for single scattering. Then for each iteration of the simulation, the scattered source radiance $\tilde{J}_{ms}^k$ is computed at block 1104 using $$\tilde{J}_{ms}^k(c_\ell) = \frac{\alpha(c_\ell)\Omega}{4\pi}(I^k(c_\ell) * p),$$

and accumulated in the source radiance buffer 1106. The exitant radiance $E^k$ is computed at block 1108 using $E^k(c_l) = (1-\alpha(c_l))I^k(c_l) + \tilde{J}_{ms}^k(c_l)$ and stored at exitant radiance buffer 1110. The exitant radiance $E^k$ is used for estimate the subsequent incident radiance $I^{k+1}$ using the previously described process H 1112 in alternation. The incident radiance $I^{k+1}$ may also stored in incident radiance buffer 1102. The multiple rendering target and frame buffer object (FBO) of OpenGL extensions are used to avoid frame buffer readbacks.

Note that for the first iteration, the scattered source radiance is not accumulated into $\tilde{J}_{ms}$, and the initial exitant radiance is simply $\tilde{J}_{ms}^1$. As in single scattering, one exemplary implementation rasterizes a 2D quad of size 32×32 for each operation.

Ray Marching—The ray march starts by initializing the final color buffer with the background lighting $L_{in}$. Then from far to near, each slice i is independently rendered in two passes.

In the first pass, the OpenGL blend mode is set to GL_ONE for both the source and target color buffers. The process that iterates over all the RBFs. For each RBF $B_l$, its intersection with the slice is first calculated. This plane-to-sphere intersection can be efficiently computed given the center and radius of the sphere. If an intersection exists, a 2D bounding quad is computed for the circular intersection region, and rendered this 2D quad.

For each pixel in the quad, denote its corresponding point in the volume as $u_i$. In the pixel shader, the density $w_l B_l(u_i)$ is evaluated and saved in the alpha channel, and $\tilde{J}_{D,l}(u_i) = w_l B_l(u_i)(y(\omega_o) \cdot \tilde{J}(c_l))$ is computed and placed in the RGB channels. With the residual $R(u_i)$ from the hash table, the process calculates and stores $\tilde{J}_{D,l}(u_i)R(u_i)$ in the RGB channels of a second color buffer. After the first pass, one thus has $$\sum_l \tilde{J}_{D,l}(u_i), \tilde{D}(u_i), \text{ and } R(u_i)\sum_i \tilde{J}_{D,l}(u_i)$$

in the color buffers, which are sent to the second pass as textures through the FBO.

In the second pass, the OpenGL blend mode is set to GL_ONE and GL_SRC_ALPHA for the source and final color buffers, respectively. Instead of drawing a small quad for each RBF as in the first pass, the exemplary process draws a large bounding quad for all RBFs that intersect with the slice. In the pixel shader, $\tilde{J}_D(u_i)$ for each pixel is evaluated according to Eq. (11) as $$\tilde{J}_D(u_i) = \sum_l \tilde{J}_{D,l}(u_i) + \left( R(u_i) \sum_l \tilde{J}_{D,l}(u_i) \right) / \tilde{D}(u_i).$$

The RGB channels of the source buffer are then computed as $\tilde{J}_D(u_i)\sigma_t \Delta u / \cos \gamma$, and the alpha channel is set to $\tilde{\tau}_i$, computed using Eq. (12).

The residual $R(u_i)$ is decoded by perfect spatial hashing as described in Lefebvre, S. et al., 2006, "Perfect spatial hashing", ACM Transactions on Graphics 25, 3, 579-588. Eight texture accesses are needed in computing a trilinear interpolation. To avoid divide-by-zero exceptions, residuals are set to zero during preprocessing when $\tilde{D}(u)$ is very small (e.g., <1.0e−10).

Exemplary Results:

The above described algorithm has been implemented on a 3.7 GHz PC with 2 GB of memory and an NVidia 8800GTX graphics card. Images are generated at a 640×480 resolution.

Smoke Visualization—As a basic function, the present system allows users to visualize smoke simulation results under environment lighting and from different viewpoints. The results with and without residual compensation have been obtained and compared. Although both may be adequate for various purposes, images with finer details are obtained with compensated ray marching.

The optical parameters of the smoke can be edited in real time. For example, for images containing the same smoke density field and lighting, adjusting the albedo downward and increasing the extinction cross section darkens the appearance of the smoke. For images with fixed lighting, changing the phase function from constant to the Henyey-Greenstein (HG) phase function (with eccentricity parameter 0.28, for example) also creates a different effect. The dependence of the scattered radiance on the view direction can also be seen.

Shadow Casting between Smoke and Objects—Combined with the spherical harmonic exponentiation (SHEXP) algorithm for soft shadow rendering, the method described herein can also render dynamic shadows cast between the smoke and scene geometry. In one embodiment, the method is able to achieve real-time performance at over 20 fps for exemplary scene containing 36K vertices. For each vertex in the scene, the exemplary embodiment first computes the visibility vector by performing SHEXP over the accumulative log visibility of all blockers. Each RBF of the smoke is regarded as a spherical blocker whose log visibility is the optical depth vector as computed according to the methods described herein. Vertex shading is then computed as the triple product of visibility, BRDF and lighting vectors. After the scene geometry is rendered, the source radiance is computed at RBF centers due to single scattering, taking the occlusions due to scene geometry into account using SHEXP. Finally, the multiple scattering simulation and compensated ray marching are performed to generate the results.

Performance: TABLE 2 lists performance statistics for three examples. The preprocessing time (for precomputation) ranges from 1 to 3 hours, which is reasonably short. The residual hash tables are significantly smaller than the original density field sequences.

TABLE 2

Exemplary Performance Results

| Scene | A | B | C |
|---|---|---|---|
| Volume grid | $128^3$ | $100^3$ | $100^3$ |
| Frames | 600 | 500 | 450 |
| Avg. RBFs per frame | 460 | 247 | 314 |
| RBF approx. RMS error | 2.48% | 1.03% | 1.34% |
| Decomposition (min) | 140 | 43 | 85 |
| Hashing (min) | 35 | 18 | 20 |
| Hash table (MB) | 218 | 57 | 67 |
| Performance (fps) | 19.1-95.1 | 36.4-57.8 | 35.8-74.8 |

In some exemplary implementations, the user can specify the maximum number of RBFs per frame for density approximation. An exemplary default value of 1000 works well for many situations. In principle, the source radiance at each voxel can be exactly reconstructed using a sufficiently large number of RBFs, but a limit on RBFs is needed in practice. A tradeoff between accuracy and performance requires a balance in practice.

CONCLUSION

A method has been described for real-time rendering of inhomogeneous light scattering media such as smoke animations. The method allows for interactive manipulation of environment lighting, viewpoint, and smoke attributes. The method may be used for efficient rendering of both static and dynamic participating media without requiring prohibitively expensive computation or precomputation, making it suitable for editing and rendering of dynamic smoke. Based on a decomposition of smoke volumes, for example, the method utilizes a low-frequency density field approximation to gain considerable efficiency, while incorporating fine details in a manner that allows for fast processing with high visual fidelity. However, it is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for rendering an inhomogeneous scattering medium represented by a density field comprising an approximate model density field and a residual density field, the method performed by a processor that executes acts comprising:

computing an approximate source radiance based on the approximate model density field;

computing an effective exitant radiance by compositing the approximate source radiance by integrating the approximate source radiance along a view ray in both the approximate model density field and the residual density field; and rendering an image of the inhomogeneous scattering medium based on the effective exitant radiance, wherein:

the approximate model density field models the density field of the inhomogeneous scattering medium; and the residual density field is a difference between the density field and the approximate model density field.

2. The method as recited in claim 1, wherein compositing the approximate source radiance comprises performing a ray marching procedure including:
  decomposing a volume space of the density field into a plurality of slices along a central view frustum; and
  calculating a discrete integral of the approximate source radiance slice by slice.

3. The method as recited in claim 2, wherein each slice has a user-controllable thickness stacking along a current view direction, and the discrete integral is calculated slice by slice along a current view direction.

4. The method as recited in claim 1, wherein the approximate model density comprises a radial basis functions (RBF) model density field which is expressed by a weighted sum of a set of RBFs each having a RBF center.

5. The method as recited in claim 4, wherein computing the approximate source radiance comprises:
  computing a value of the approximate source radiance at each RBF center; and
  approximating values of the approximate source radiance at other points in the volume space by interpolating from the values of the source radiance at the RBF centers.

6. The method as recited in claim 1, wherein the residual density field is obtained by computing a difference between the density field and the approximate model density field.

7. The method as recited in claim 1, further comprising:
  zeroing entries of the residual density field at points where the residual density field has a value at or below a given threshold.

8. The method as recited in claim 1, further comprising: compressing values of the residual density field.

9. The method as recited in claim 1, further comprising: compressing values of the residual density field by performing a spatial hashing on values of the residual density field.

10. The method as recited in claim 1, wherein the inhomogeneous scattering medium comprises smoke.

11. The method as recited in claim 1, wherein the inhomogeneous scattering medium is a part of a video or animation comprising a sequence of renderings of images rendered at time intervals, and wherein at least one of the approximate source radiance and the effective exitant radiance is computed in real time at each time interval.

12. The method as recited in claim 11, wherein both the approximate source radiance and the effective exitant radiance are computed in real time at each time interval.

13. The method as recited in claim 1, wherein computing the approximate source radiance comprises computing a single scattering term of the source radiance.

14. The method as recited in claim 13, wherein computing the single scattering term comprises computing a spherical harmonic product and a convolution term $[(L_{in}*\tilde{\tau}(c_i))\star p]$, wherein $L_{in}$ is a vector representing a spherical harmonic projection of incident radiance $L_{in}$, $\tilde{\tau}(c_j)$ is transmittance vector associated with RBF center $c_j$, and p is a vector representing a spherical harmonic projection of phase function p.

15. The method as recited in claim 1, wherein computing the approximate source radiance comprises computing a single scattering term and a multiple scattering term of the source radiance.

16. A method for rendering an inhomogeneous scattering medium represented by a density field comprising an approximate model density field and a residual density field, the method performed by a processor that executes acts comprising:
  computing an approximate source radiance based on the approximate model density field;
  computing a base component of an effective exitant radiance by integrating the approximate source radiance along a view ray in the approximate model density field;
  computing a compensation component of the effective exitant radiance by integrating the approximate source radiance along the view ray in the residual density field; and
  rendering an image of the inhomogeneous scattering medium based on the effective exitant radiance,
  wherein:
  the approximate model density field models the density field of the inhomogeneous scattering medium; and
  the residual density field is a difference between the density field and the approximate model density field.

17. The method as recited in claim 16, wherein compositing the approximate source radiance comprises performing a ray marching procedure including:
  decomposing a volume space of the density field into a plurality of slices along a central view frustum; and
  calculating a discrete integral of the approximate source radiance slice by slice.

18. The method as recited in claim 16, wherein the approximate model density comprises a radial basis functions (RBF) model density field which is expressed by a weighted sum of a set of RBFs each having a RBF center.

19. The method as recited in claim 16, further comprising:
  zeroing entries of the residual density field at points where the residual density field has a value at or below a given threshold; and
  compressing the nonzero entries of the residual density field.

20. One or more non-transitory storage medium having stored thereupon a plurality of instructions that, when executed by one or more processors, causes the processor(s) to:
  compute an approximate source radiance based on the approximate model density field;
  compute an effective exitant radiance by compositing the approximate source radiance by integrating the approximate source radiance along a view ray in both the approximate model density field and the residual density field; and
  render an image of the inhomogeneous scattering medium based on the effective exitant radiance,
  wherein:
  the approximate model density field models a density field of the inhomogeneous scattering medium; and
  the residual density field is a difference between the density field and the approximate model density field.

* * * * *

UNITED STATES PATENT AND TRADEMARK OFFICE
CERTIFICATE OF CORRECTION

PATENT NO. : 7,990,377 B2
APPLICATION NO. : 11/830743
DATED : August 2, 2011
INVENTOR(S) : Kun Zhou et al.

It is certified that error appears in the above-identified patent and that said Letters Patent is hereby corrected as shown below:

In column 24, line 41, in Claim 20, delete "non-transitory storage medium" and insert -- memory --, therefor.

Signed and Sealed this
Eighth Day of November, 2011

David J. Kappos
*Director of the United States Patent and Trademark Office*